(12) United States Patent
Bhardwaj et al.

(10) Patent No.: US 11,299,348 B1
(45) Date of Patent: Apr. 12, 2022

(54) CONTAINER DEPALLETIZING SYSTEMS AND METHODS

(71) Applicant: Amazon Technologies, Inc., Seattle, WA (US)

(72) Inventors: Abhinav Bhardwaj, Aberdeen (GB); Tolga Kol, Luxembourg (LU); Matteo Camelin, Luxembourg (LU); Stefano La Rovere, Bereldange (LU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/658,607

(22) Filed: Oct. 21, 2019

(51) Int. Cl.
*B65G 1/14* (2006.01)

(52) U.S. Cl.
CPC .................................... *B65G 1/14* (2013.01)

(58) Field of Classification Search
CPC .. B65G 59/062; B65G 57/303; B65G 1/0428; B65G 1/023; B65G 1/14; B65G 1/1371; B65G 59/06; B65G 59/063; B65G 57/302; B65G 1/026; A47F 5/0081
See application file for complete search history.

(56) References Cited

U.S. PATENT DOCUMENTS

| | | | | |
|---|---|---|---|---|
| 2,447,959 A * | 8/1948 | Phillips | ............... | B60P 1/4421 414/795.2 |
| 2,779,487 A * | 1/1957 | Harris | ............... | B60P 1/02 414/787 |
| 2,844,263 A * | 7/1958 | Dreyer | ............... | B65G 59/08 414/799 |
| 3,038,615 A * | 6/1962 | Roth | ............... | B65G 59/062 414/796.4 |
| 3,074,595 A * | 1/1963 | Boller | ............... | B65G 59/062 221/221 |
| 3,139,993 A * | 7/1964 | Lauer | ............... | B65G 59/062 414/796.2 |
| 3,172,545 A * | 3/1965 | Schmid | ............... | B65G 59/062 414/795.8 |
| 3,187,917 A * | 6/1965 | Miller | ............... | B66F 9/06 414/664 |
| 3,313,433 A * | 4/1967 | Hallenius | ............... | B65G 59/12 414/416.05 |
| 3,637,095 A * | 1/1972 | Kampfer | ............... | B65G 65/00 414/331.07 |

(Continued)

*Primary Examiner* — Gregory W Adams
(74) *Attorney, Agent, or Firm* — Athorus, PLLC

(57) ABSTRACT

Container depalletization systems and methods may include various example depalletizing stations including a frame and a plurality of fork assemblies. For example, the frame may receive a stack of containers, and the plurality of fork assemblies may engage, lift, lower, and release layers of containers from the stack of containers to downstream stations or processes. In addition, the example depalletizing stations may include transfer elevator assemblies that may receive layers of containers from the plurality of fork assemblies and transfer the layers of containers to downstream stations or processes. Further, the example depalletizing stations may include movable frames that may move between a first position, at which layers of containers may be engaged and lifted by the plurality of fork assemblies, and a second position, at which layers of containers may be lowered and released by the plurality of fork assemblies and transferred to downstream stations or processes.

20 Claims, 14 Drawing Sheets

(56) References Cited

U.S. PATENT DOCUMENTS

| | | | | | |
|---|---|---|---|---|---|
| 3,904,045 | A | * | 9/1975 | Thibault | B65G 57/303 414/788.9 |
| 4,323,169 | A | * | 4/1982 | Guigan | B65G 59/062 221/124 |
| 4,632,620 | A | * | 12/1986 | Wiggers | B65G 57/303 414/795.2 |
| 4,764,074 | A | * | 8/1988 | Postigo | B65G 57/303 414/789.1 |
| 4,809,881 | A | * | 3/1989 | Becker | B65G 59/103 141/172 |
| 5,007,785 | A | * | 4/1991 | van der Schoot | B65G 61/00 414/331.11 |
| 5,246,326 | A | * | 9/1993 | Boutet | G03B 42/045 414/609 |
| 5,607,282 | A | * | 3/1997 | Brannen | B65G 59/00 414/796.3 |
| 5,645,392 | A | * | 7/1997 | Leichty | B65G 59/063 414/416.01 |
| 5,868,545 | A | * | 2/1999 | Kasai | B65G 65/00 414/808 |
| 6,149,149 | A | * | 11/2000 | Gammerler | B65H 31/32 271/218 |
| 6,331,095 | B1 | * | 12/2001 | Hiroki | H01L 21/68742 414/222.01 |
| 7,329,081 | B2 | * | 2/2008 | Baker | B65G 1/04 414/268 |
| 7,334,979 | B2 | * | 2/2008 | Chuang | H01L 21/67754 414/331.16 |
| 7,360,628 | B2 | * | 4/2008 | Charvet | B66F 9/12 187/237 |
| 7,637,712 | B2 | * | 12/2009 | Varney | B07C 3/008 198/347.2 |
| 7,717,665 | B2 | * | 5/2010 | Jenkins | B65G 57/302 414/795.2 |
| 7,731,473 | B2 | * | 6/2010 | Yuyama | B65G 59/063 414/795.6 |
| 8,480,348 | B2 | * | 7/2013 | Hyobu | H01L 21/67346 414/304 |
| 8,978,405 | B2 | * | 3/2015 | Alberghetti | F25D 27/00 62/264 |
| 9,302,858 | B2 | * | 4/2016 | Junghans | B65G 59/023 |

\* cited by examiner

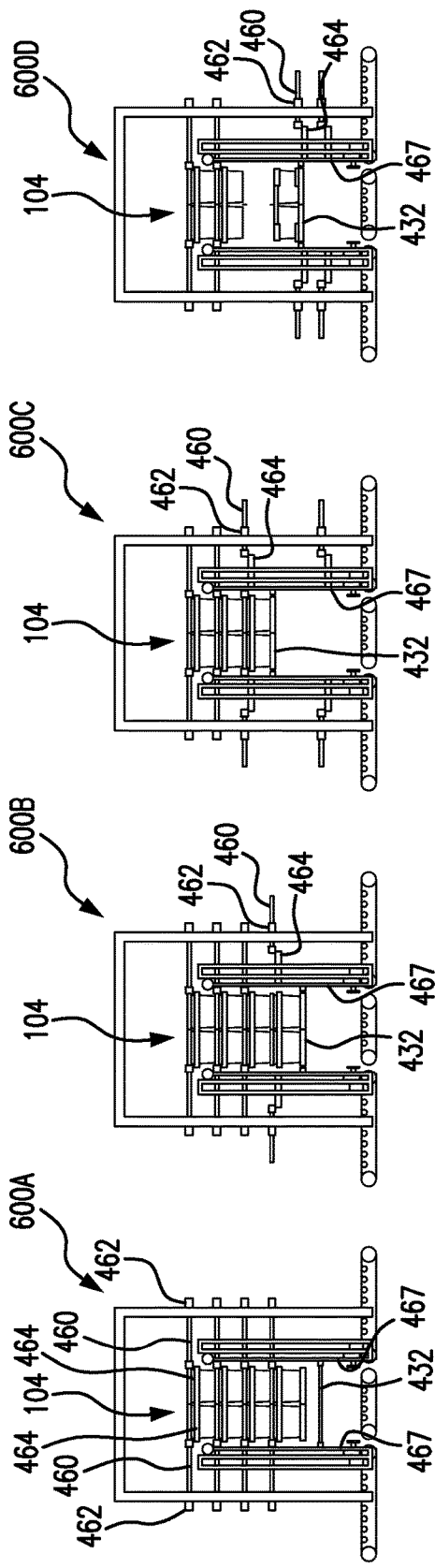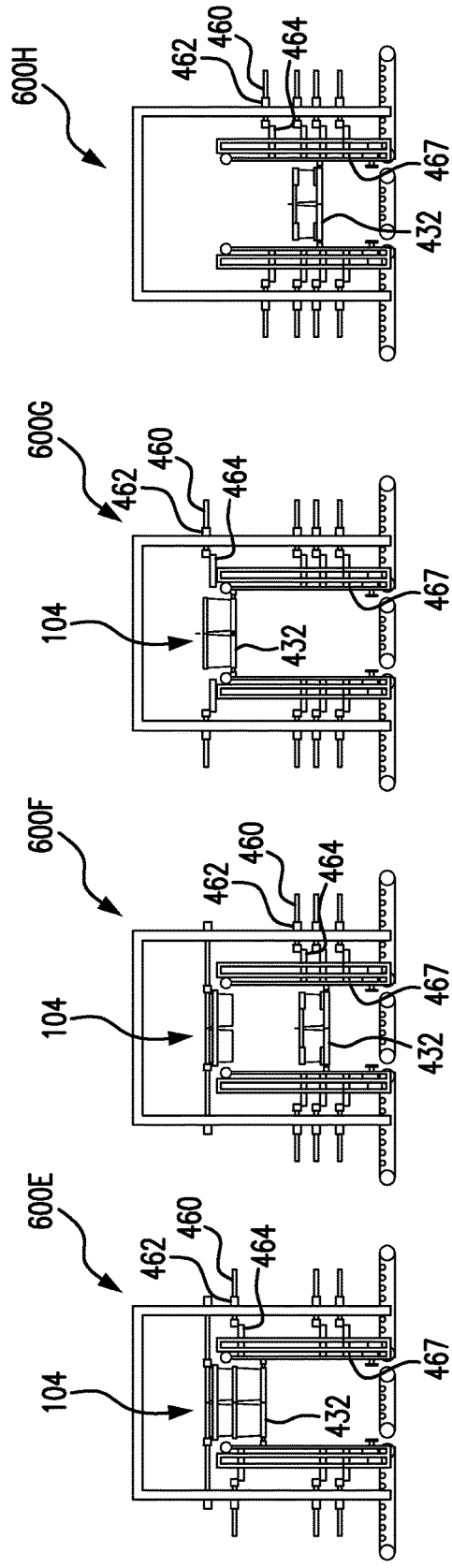

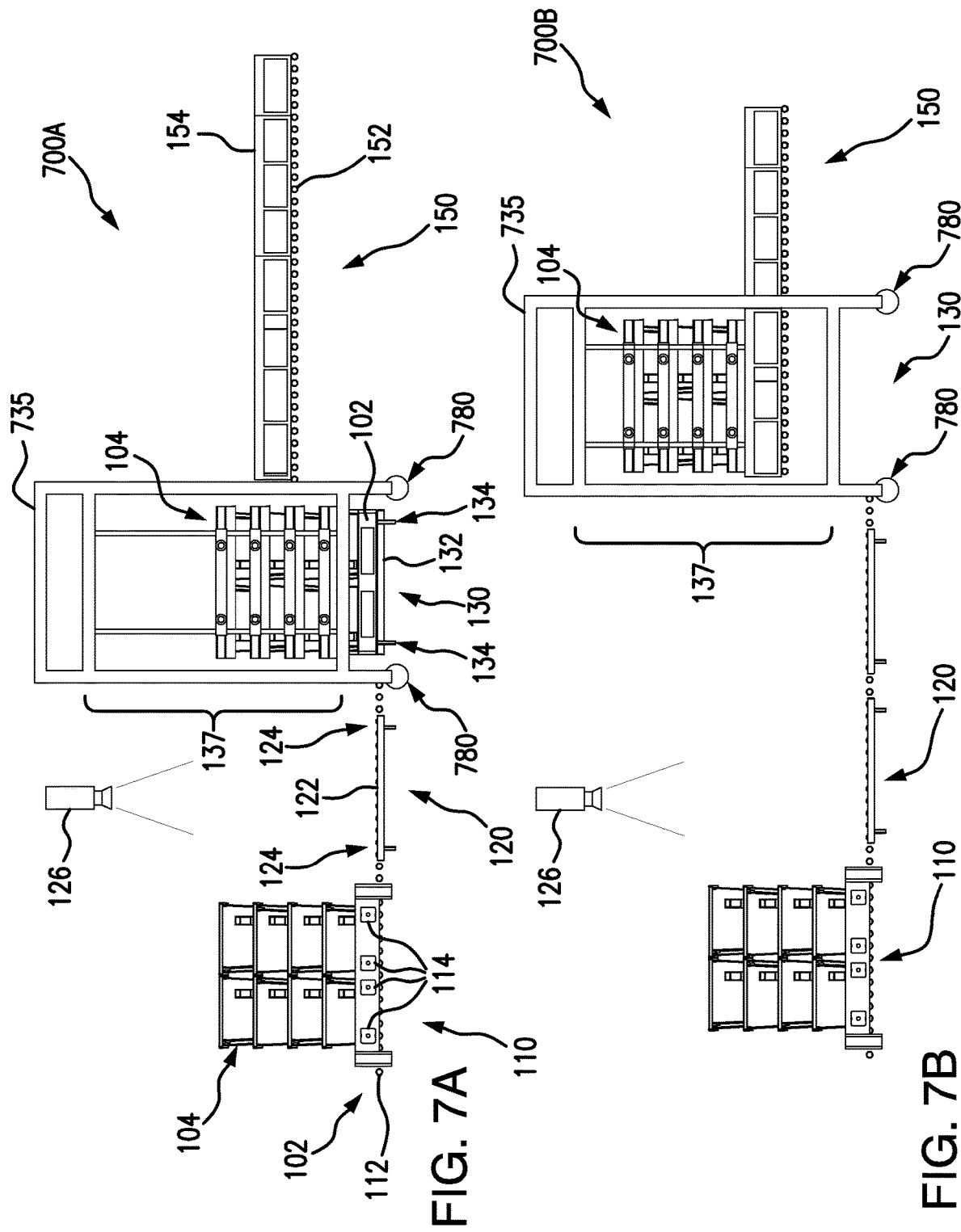

CONTAINER DEPALLETIZING SYSTEMS AND METHODS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for flexible and automated systems and methods to facilitate the various material handling processes within a material handling facility, thereby improving the speed and efficiency of such processes.

BRIEF DESCRIPTION OF THE DRAWINGS

FIGS. 6A-6H are schematic, side view diagrams of an example sequence of operations of an example depalletizing station having a transfer elevator of a container depalletizing system, in accordance with implementations of the present disclosure.

FIGS. 7A-7B are schematic, side view diagrams of an example sequence of operations of an example movable depalletizing station of a container depalletizing system, in accordance with implementations of the present disclosure.

DETAILED DESCRIPTION

Figure 1:
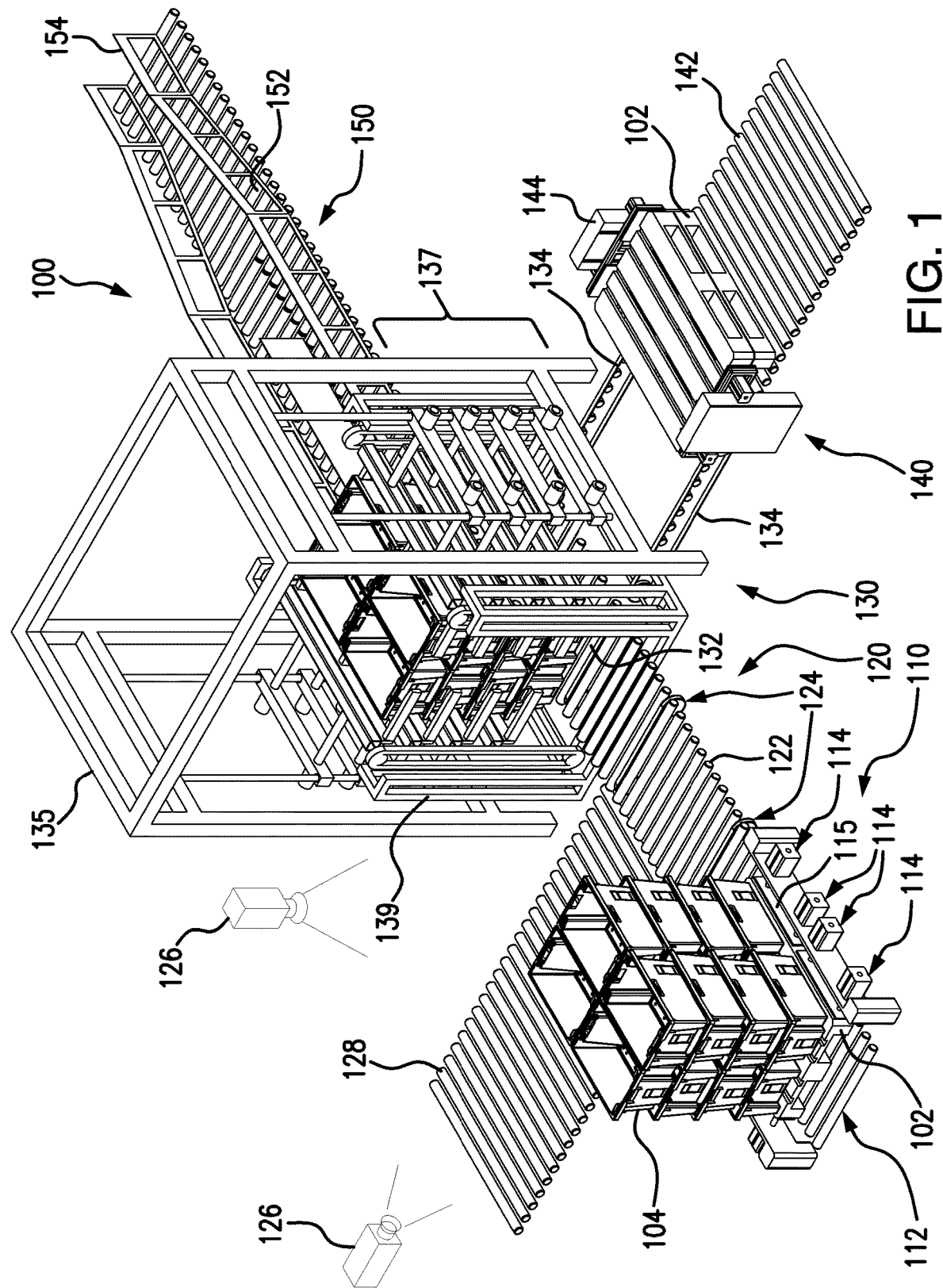
FIG. 1 is a schematic, perspective view diagram of an example container depalletizing system, in accordance with implementations of the present disclosure.

As is set forth in greater detail below, implementations of the present disclosure are directed to container depalletizing systems and methods that can engage, lift, lower, and sequentially release layers of containers from a stack of containers, e.g., a stack of containers on a pallet.

In example embodiments, a container depalletizing system may include a reorientation station, a check station, a bypass station, a depalletizing station, a pallet stacking station, and a downstream conveyor and/or downstream station.

For example, the reorientation station may align and/or orient a pallet carrying a stack of containers to facilitate depalletizing of the containers. In addition, the check station may utilize one or more imaging devices to detect alignment and/or orientation of containers on the pallet. If the alignment and/or orientation of the containers on the pallet are not within threshold values, then the pallet may be transferred to a bypass station. If the alignment and/or orientation of the containers on the pallet are within threshold values, then the pallet may be transferred to the depalletizing station. Further, an empty pallet may be transferred from the depalletizing station to a pallet stacking station. Moreover, containers that are depalletized at the depalletizing station may be transferred to a downstream conveyor and/or downstream station.

In example embodiments, the depalletizing station may include a frame and a plurality of fork assemblies movably coupled to the frame. The frame may be configured to receive the stack of containers. The plurality of fork assemblies may be configured to engage, lift, lower, and release containers by moving between extended positions and retracted positions and/or by moving vertically relative to the frame. In the extended positions, the plurality of fork assemblies may engage containers, and in the retracted positions, the plurality of fork assemblies may release containers. Further, in the extended positions, the plurality of fork assemblies may lift and lower containers vertically relative to the frame. Using the plurality of fork assemblies, the depalletizing station may engage and lift all layers of containers of a stack of containers, and then may sequentially lower and release layers of containers onto a downstream conveyor and/or downstream station, thereby depalletizing the stack of containers.

In other example embodiments, the depalletizing station may also include a transfer elevator. The transfer elevator may be positioned under the stack of containers received by the frame, and may be configured to move vertically relative to the frame. For example, responsive to engaging and lifting all layers of containers of a stack of containers using the plurality of fork assemblies, the transfer elevator may move vertically to support a lowest layer of containers. Then, respective fork assemblies that have engaged and lifted the lowest layer of containers may move to their respective retracted positions, thereby releasing the lowest layer of containers onto the transfer elevator. The transfer elevator may then move vertically to align with a downstream conveyor and/or downstream station, and the transfer elevator may transfer the lowest layer of containers to the downstream conveyor and/or downstream station.

In further example embodiments, the depalletizing station may also include at least one rail, track, guide, or other path along which the frame may move between a first position and a second position. For example, the frame may include wheels, rollers, bearings, or other linear movement components to facilitate movement between the first position and the second position. At the first position, the frame may receive the stack of containers, and the plurality of fork assemblies may engage and lift all layers of containers of a stack of containers. The frame may then move from the first position to the second position. At the second position, a downstream conveyor and/or downstream station may be positioned under the frame and the plurality of fork assemblies carrying containers. Then, the plurality of fork assemblies may sequentially lower and release layers of containers onto the downstream conveyor and/or downstream station at the second position, thereby depalletizing the stack of containers. Upon completion of depalletizing of the stack of containers, the frame may then move from the second position back to the first position to receive a subsequent stack of containers.

Further, a controller may control various operations of the example container depalletizing systems and various stations, components, and/or portions thereof, to align, reorient, engage, lift, move, lower, release, and/or transfer layers of containers of the stack of containers, thereby depalletizing the stack of containers. For example, the controller may be in communication with various actuators, conveyors, rollers, belts, imaging devices, vision systems, sensors, other components, and/or other component controllers, in order to receive, engage, and depalletize stacks of containers.

In example embodiments, the container depalletizing systems may be configured to align, engage, lift, move, lower, release, and/or transfer layers of containers including one, two, three, or four containers, such as rectangular or square totes or bins. In other example embodiments, the container depalletizing systems may be sized, shaped, and/or configured to align, engage, lift, move, lower, release, and/or transfer layers of containers including other numbers, types, sizes, or shapes of containers, totes, bins, or trays.

Using the container depalletizing systems and methods described herein, layers of containers of a stack of containers may be reliably and quickly depalletized and transferred to various downstream stations or processes, thereby improving the speed and efficiency of such material handling processes.

Figure 2:
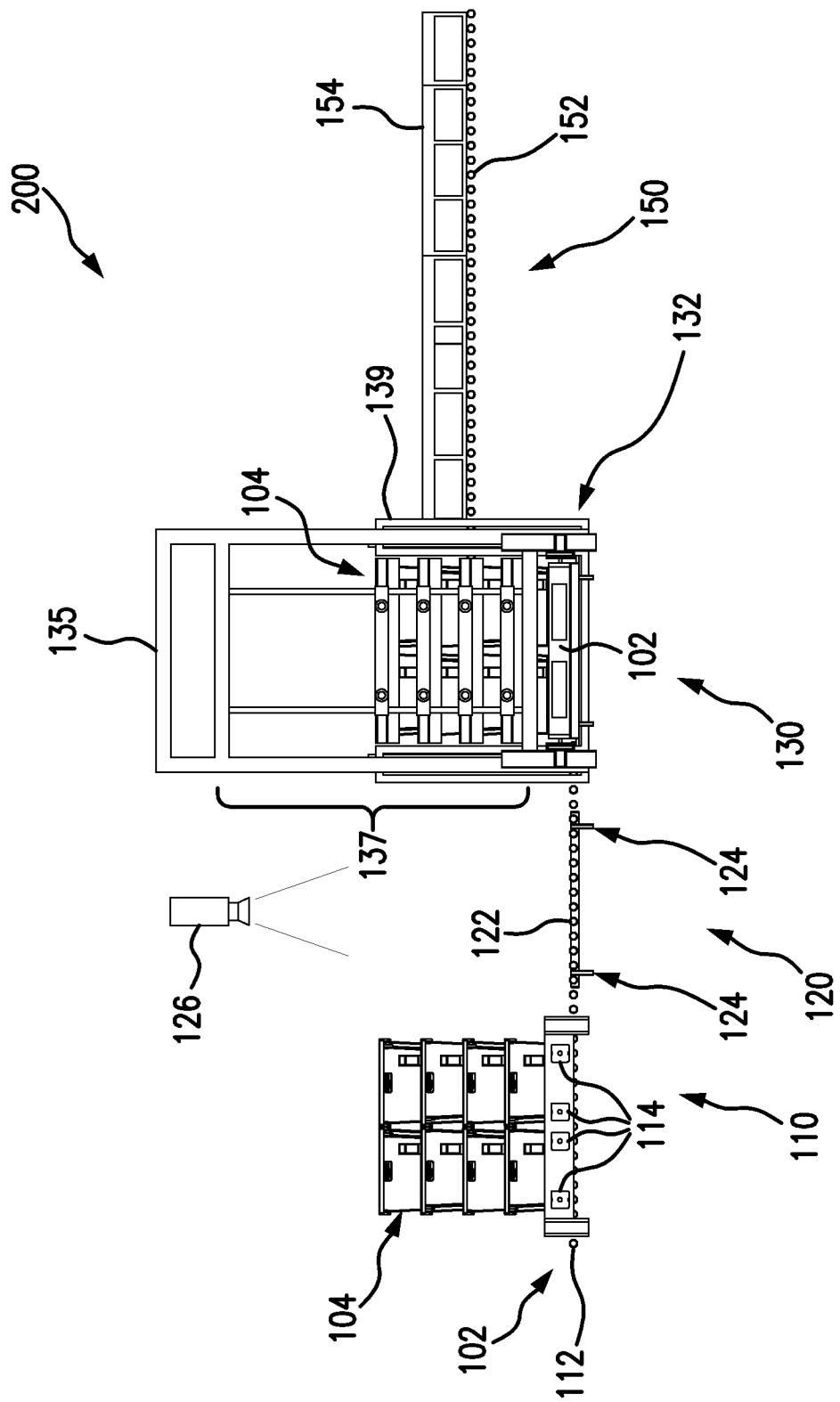
FIG. 2 is a schematic, side view diagram of an example container depalletizing system, in accordance with implementations of the present disclosure.

FIG. 1 is a schematic, perspective view diagram 100 of an example container depalletizing system, in accordance with implementations of the present disclosure, and FIG. 2 is a schematic, side view diagram 200 of an example container depalletizing system, in accordance with implementations of the present disclosure.

The example container depalletizing system may include a reorientation station 110, a check station 120, a bypass station 128, a depalletizing station 130, a pallet stacking station 140, and a downstream station 150. Certain portions of the example container depalletizing system, e.g., bypass station 128 and pallet stacking station 140, are not shown in FIG. 2 for clarity.

In example embodiments, the reorientation station 110 may include a conveyor or rollers 112 that is configured to receive a pallet 102 having stacked containers 104. The pallet 102 of stacked containers 104 may be placed on the conveyor 112 by a forklift, robotic arm, gantry system, other robotic or automated machine or apparatus, an upstream conveyor, or other material handling equipment. Each of the containers 104 may comprise a tote, bin, box, crate, tray, or other type of container, and each container 104 may include one or more structural ribs or edges associated with outer peripheries of the container 104 by which each container 104 may be engaged, supported, lifted, and lowered. In example embodiments, each of the containers 104 stacked on the pallet 102 may have substantially the same size, shape, and configuration.

At the reorientation station 110, wrapping, film, cardboard, straps, or other container packaging or restraining components may be removed from the pallet 102 of stacked containers 104, e.g., by human or automated agents. In addition, one or more alignment plates 115 coupled to one or more actuators 114 on opposite sides of the conveyor 112 may contact and/or push opposite sides of the pallet 102 in order to center or align the pallet 102 with respect to the conveyor 112. The one or more actuators 114 may comprise solenoids, pneumatic cylinders, hydraulic cylinders, other linear actuators, worm or screw drives, rack and pinion drives, other rotary actuators, or other types of actuators, and the one or more alignment plates 115 may be substantially flat plates, beams, or rods formed of metals, plastics, composites, or combinations thereof. The alignment plates 115 may be coupled to the one or more actuators 114 and moved toward or away from the pallet 102 placed on the conveyor 112. In example embodiments, the one or more actuators 114 and alignment plates 115 on opposite sides of the pallet 102 and conveyor 112 may be actuated and moved the same distance and/or with the same force in order to center or align the pallet 102 with respect to the conveyor 112. Further aspects of the reorientation station 110 are shown and described herein in more detail at least with respect to FIG. 3. After aligning the pallet 102 using the one or more actuators 114 and alignment plates 115, the conveyor 112 may transfer the pallet 102 of stacked containers 104 to the check station 120.

In example embodiments, the check station 120 may include a conveyor or rollers 122 that is configured to receive a pallet 102 having stacked containers 104, a transverse conveyor, belts, or rollers 124, one or more imaging devices 126, and a bypass station 128. The check station 120 may receive the pallet 102 of stacked containers 104 from the conveyor 112 of the reorientation station 110. Each of the containers 104 may be stacked or nested together on the pallet 102 in a particular arrangement or configuration, and the stacked arrangement or configuration may include various tolerances associated with offsets and/or rotations of one or more containers 104 relative to other containers 104 stacked on the pallet 102. The various offsets and/or rotations may include offsets and/or rotations of containers within a plane associated with a layer of containers of the stack, may include offsets and/or rotations of containers transverse or perpendicular to a plane associated with a layer of containers of the stack, and/or may include various other offsets and/or rotations of containers relative to each other and/or the pallet.

In some example embodiments, the container depalletizing systems described herein may be designed or configured to process stacked containers having maximum offsets and/or rotations of one or more containers of up to approximately 50 mm from expected positions and/or orientations of containers stacked on a pallet. In other example embodiments, the container depalletizing systems described herein may be designed or configured to process stacked containers having various other thresholds or limits, either less than or greater than approximately 50 mm, associated with maximum offsets and/or rotations of one or more stacked containers.

At the check station 120, the one or more imaging devices 126 may capture imaging data of the pallet 102 of stacked containers 104. The one or more imaging devices 126 may be positioned or oriented at various locations relative to the check station 120, such as overhead, to the side, at an angle, or at various other locations. In addition, the one or more imaging devices 126 may comprise imaging sensors, cameras, infrared sensors, depth sensors, 2D or 3D imaging devices, or other types of imaging devices. The imaging data captured by the one or more imaging devices 126 may be processed using various image processing techniques or algorithms, such as object, feature, surface, edge, line, or other image recognition or processing algorithms. Based on the processing of the imaging data, maximum offsets and/or rotations of one or more containers may be determined relative to expected positions and/or orientations of stacked containers, and the maximum offsets and/or rotations may be compared with one or more thresholds or limits.

If the determined maximum offsets and/or rotations of one or more containers exceeds the one or more thresholds or limits, it may be determined that the pallet 102 of stacked containers 104 cannot be processed using the container depalletizing stations described herein, and the pallet 102 may be transferred to the bypass station 128. For example, the transverse conveyor, belts, or rollers 124 may be actuated to transfer the pallet 102 from the check station 120 to the bypass station 128. Various corrective actions may be performed at the bypass station 128, e.g., by human or automated agents, to reduce the maximum offsets and/or rotations of one or more containers to within the one or more thresholds or limits.

If the determined maximum offsets and/or rotations of one or more containers are within the one or more thresholds or limits, it may be determined that the pallet 102 of stacked containers 104 can be processed using the container depalletizing stations described herein, and the pallet 102 may be transferred to the depalletizing station 130. For example, the conveyor 122 may transfer the pallet 102 of stacked containers 104 to the depalletizing station 130.

In example embodiments, the depalletizing station 130 may include a conveyor or rollers 132 that is configured to receive a pallet 102 having stacked containers 104, a transverse conveyor, belts, or rollers 134, a frame 135 configured to receive the pallet 102 of stacked containers 104, and a plurality of fork assemblies 137 movably coupled to the frame 135. In some example embodiments, the depalletizing station 130 may also include a transfer elevator assembly 139. The depalletizing station 130 may receive the pallet 102 of stacked containers 104 from the conveyor 122 of the check station 120.

At the depalletizing station 130, the plurality of fork assemblies 137 may be positioned on opposite sides of the frame 135 and on opposite sides of the pallet 102 of stacked containers 104 received within the frame 135. Upon receiving the pallet 102 of stacked containers 104 within the frame 135, the plurality of fork assemblies 137 may be configured to engage individual layers of the stacked containers 104 by moving from retracted positions to extended positions. For example, a pair of fork assemblies on opposite sides of the frame 135 may move from retracted positions to extended positions to engage a single layer of stacked containers 104. As shown in FIG. 1, four pairs of fork assemblies may be associated with opposite sides of the frame 135 in order to engage four layers of stacked containers 104.

Upon engaging individual layers of the stacked containers 104, the plurality of fork assemblies 137 may lift or raise the layers of containers 104 within the frame 135. For example, each pair of fork assemblies on opposite sides of the frame 135 may lift a respective layer of containers 104. In this manner, all layers of containers 104 may be lifted off the pallet 102, and individual layers of containers 104 may be lifted different distances, e.g., each layer may be lifted such that a defined distance separates adjacent layers of containers 104.

Upon lifting all layers of containers 104 off the pallet 102, the empty pallet 102 may be transferred to the pallet stacking station 140. For example, the transverse conveyor, belts, or rollers 134 may be actuated to transfer the empty pallet 102 from the depalletizing station 130 to the pallet stacking station 140.

Furthermore, upon lifting all layers of containers 104 off the pallet 102, each layer of lifted containers 104 may then be sequentially or individually, e.g., layer by layer, transferred to a downstream station 150. For example, the transfer elevator assembly 139 may include a transfer elevator that is positioned under the layers of lifted containers 104 and that is vertically movable relative to the frame 135. The transfer elevator may move vertically to support a lowest layer of lifted containers 104, a pair of fork assemblies engaged with the lowest layer of lifted containers 104 may also move vertically to lower the lowest layer of lifted containers 104 toward the transfer elevator, and the pair of fork assemblies engaged with the lowest layer of lifted containers 104 may move from extended positions to retracted positions to release the lowest layer of lifted containers 104 onto the transfer elevator. Then, the transfer elevator may move vertically to align with the downstream station 150, and may transfer the received lowest layer of lifted containers 104 to the downstream station 150.

In some example embodiments, the plurality of fork assemblies 137 may include one or more counterweights or counterbalancing elements or mechanisms to facilitate vertical movement of the plurality of fork assemblies 137. In addition, the transfer elevator assembly 139 may also include one or more counterweights or counterbalancing elements or mechanisms to facilitate vertical movement of the transfer elevator. In this manner, vertical movements of the plurality of fork assemblies 137 and/or the transfer elevator assembly 139, with or without respective engaged or supported containers, may be assisted by the counterweights or counterbalancing elements or mechanisms, such that various actuators associated with the plurality of fork assemblies 137 and/or the transfer elevator assembly 139 may be reduced in size or capacity and/or configured to utilize less power.

The operations of the transfer elevator assembly 139 and the plurality of fork assemblies 137 described above may repeat to transfer additional layers of lifted containers to the downstream station 150. Further aspects of an example depalletizing station 130 are shown and described herein in more detail at least with respect to FIGS. 4-6H. In addition, other example embodiments of depalletizing stations are shown and described herein in more detail at least with respect to FIGS. 7A-9.

In example embodiments, the pallet stacking station 140 may include a conveyor or rollers 142 that is configured to receive an empty pallet 102, and a pallet stacking apparatus 144. The pallet stacking station 140 may receive the empty pallet 102 from the transverse conveyor, belts, or rollers 134 of the depalletizing station 130. In example embodiments, the transverse conveyor, belts, or rollers 134 may comprise multiple segments, sections, or portions that may be positioned under the depalletizing station 130 and/or may extend from the depalletizing station 130 to the pallet stacking station 140, e.g., may extend to the conveyor or rollers 142 of the pallet stacking station 140. At the pallet stacking station 140, the pallet stacking apparatus 144 may lift and stack empty pallets 102, and the stacked pallets may be transferred by the conveyor 142 to various other downstream stations or processes.

In example embodiments, the downstream station 150 may include a conveyor or rollers 152 that is configured to receive depalletized containers 104, and one or more rails, guides, or guards 154 to guide the containers to one or more further downstream stations or processes. In other example embodiments, the downstream station 150 may comprise slides, chutes, belts, stations, platforms, other robotic or automated machines or apparatus, storage locations, transport trailers, freight containers, or other material handling equipment configured to route the depalletized containers to further downstream stations or processes.

Although FIG. 1 shows and describes a particular number, configuration, and arrangement of stations, conveyors, actuators, imaging devices, fork assemblies, transfer elevator assemblies, and various other components of an example container depalletizing system, in other example embodiments, an example container depalletizing system may include other numbers, configurations, and arrangements of the various components described herein. For example, in some example embodiments, the reorientation station and the check station may be combined into a single station. In other example embodiments, the pallet stacking station may be positioned at other locations relative to the depalletizing station, e.g., substantially parallel to and under the downstream station. In further example embodiments, the downstream station may be positioned at other heights relative to the depalletizing station. In still further example embodiments, the depalletizing station may include other numbers or configurations of fork assemblies. In other example embodiments, the transfer elevator assembly may be omitted, and other modifications may be made to the depalletizing station and its operations, as further described herein at least with respect to FIGS. 7A-9.

Using the example container depalletizing systems and methods described herein, pallets of stacked containers may be quickly and efficiently depalletized, e.g., layer by layer, and transferred to various downstream stations or processes, thereby improving the speed and efficiency of such material handling processes.

Figure 3:
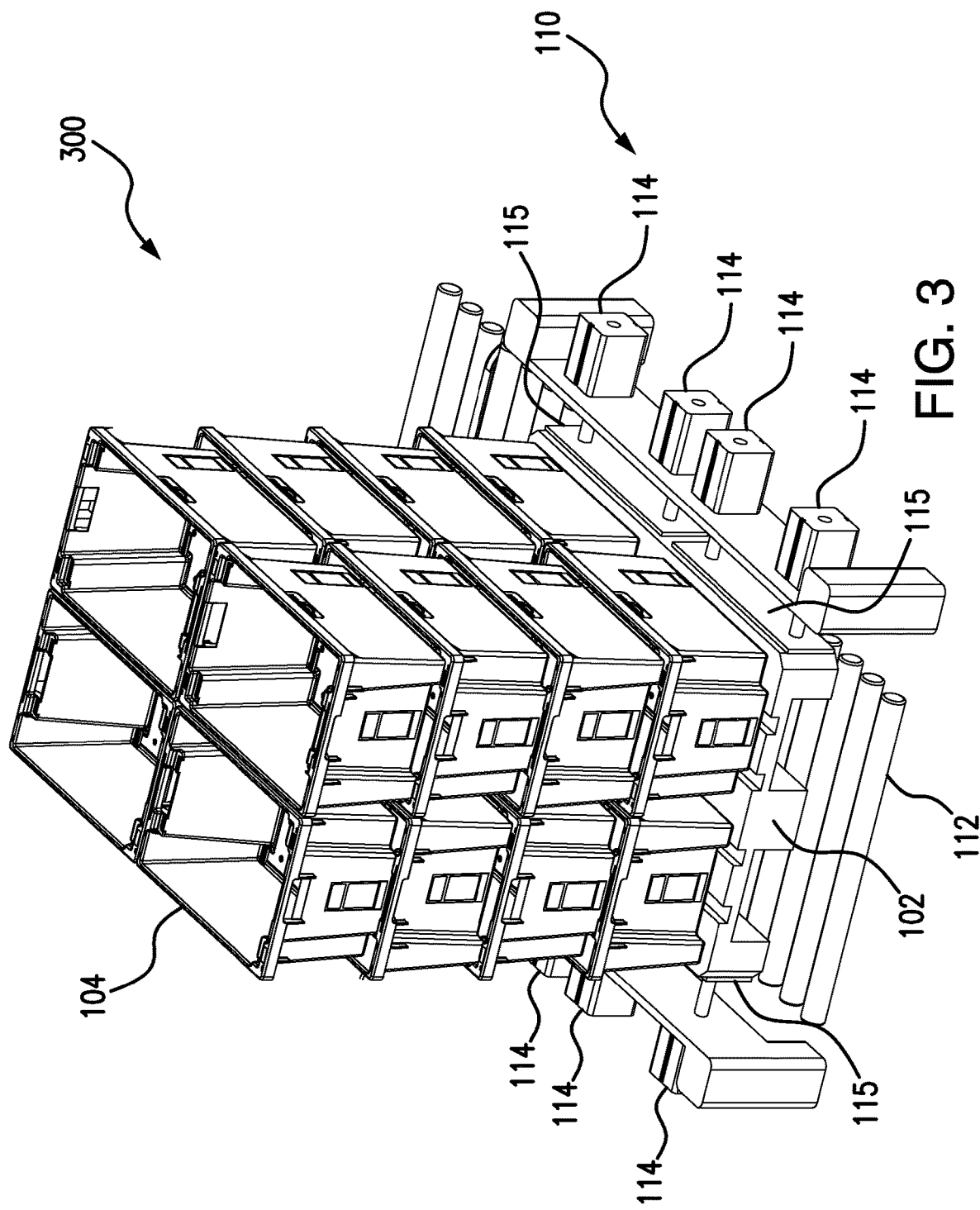
FIG. 3 is a schematic, perspective view diagram of an example reorientation station of a container depalletizing system, in accordance with implementations of the present disclosure.

FIG. 3 is a schematic, perspective view diagram 300 of an example reorientation station of a container depalletizing system, in accordance with implementations of the present disclosure.

In example embodiments, the reorientation station 110 may include a conveyor or rollers 112 that is configured to receive a pallet 102 having stacked containers 104. The pallet 102 of stacked containers 104 may be placed on the conveyor 112 by a forklift, robotic arm, gantry system, other robotic or automated machine or apparatus, an upstream conveyor, or other material handling equipment. Each of the containers 104 may comprise a tote, bin, box, crate, tray, or other type of container, and each container 104 may include one or more structural ribs or edges associated with outer peripheries of the container 104 by which each container 104 may be engaged, supported, lifted, and lowered. In example embodiments, each of the containers 104 stacked on the pallet 102 may have substantially the same size, shape, and configuration.

As described above, at the reorientation station 110, wrapping, film, cardboard, straps, or other container packaging or restraining components may be removed from the pallet 102 of stacked containers 104, e.g., by human or automated agents. In addition, one or more alignment plates 115 coupled to one or more actuators 114 on opposite sides of the conveyor 112 may contact and/or push opposite sides of the pallet 102 in order to center or align the pallet 102 with respect to the conveyor 112. The one or more actuators 114 may comprise solenoids, pneumatic cylinders, hydraulic cylinders, other linear actuators, worm or screw drives, rack and pinion drives, other rotary actuators, or other types of actuators, and the one or more alignment plates 115 may be substantially flat plates, beams, or rods formed of metals, plastics, composites, or combinations thereof. The alignment plates 115 may be coupled to the one or more actuators 114 and moved toward or away from the pallet 102 placed on the conveyor 112. In example embodiments, the one or more actuators 114 and alignment plates 115 on opposite sides of the pallet 102 and conveyor 112 may be actuated and moved the same distance and/or with the same force in order to center or align the pallet 102 with respect to the conveyor 112. After aligning the pallet 102 using the one or more actuators 114 and alignment plates 115, the conveyor 112 may transfer the pallet 102 of stacked containers 104 to a subsequent station, such as a check station 120.

Although FIG. 3 illustrates two actuators 114 associated or coupled with each alignment plate 115, and two alignment plates 115 associated with each side of the pallet 102, in other example embodiments, other numbers, configurations, or arrangements of actuators and alignment plates may be used to reorient and align pallets with respect to the conveyor. For example, a single alignment plate may be associated with each side of a pallet, multiple alignment plates may be associated with each side of a pallet, a single actuator may be coupled with each alignment plate, multiple actuators may be coupled with each alignment plate, and/or multiple alignment plates may be coupled with each actuator.

Figure 4:
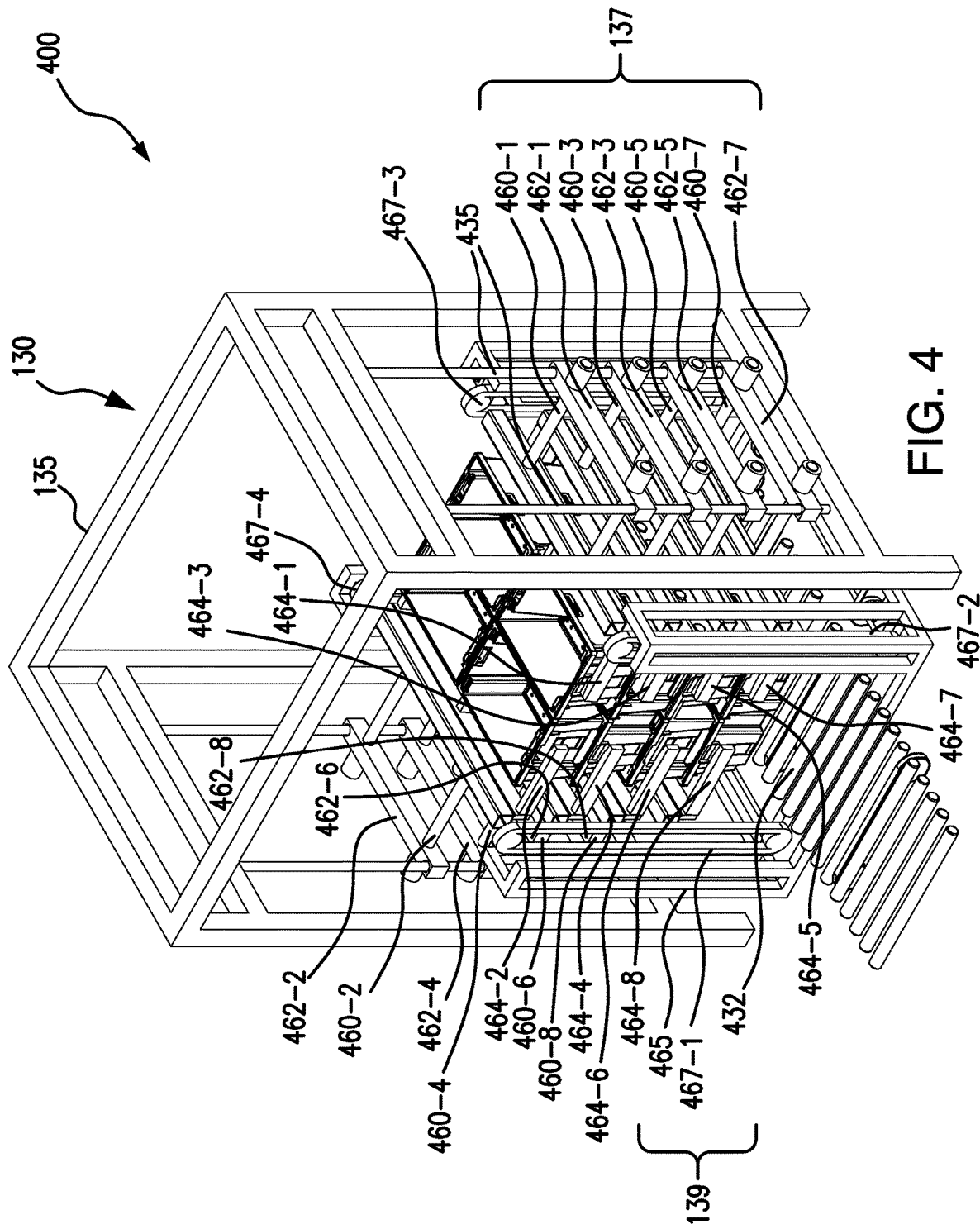
FIG. 4 is a schematic, perspective view diagram of an example depalletizing station having a transfer elevator of a container depalletizing system, in accordance with implementations of the present disclosure.

FIG. 4 is a schematic, perspective view diagram 400 of an example depalletizing station having a transfer elevator of a container depalletizing system, in accordance with implementations of the present disclosure.

As shown in FIG. 4, the example depalletizing station 130 may include a frame 135 configured to receive a pallet of stacked containers, a plurality of fork assemblies 137 movably coupled to the frame 135, and a transfer elevator assembly 139. In addition, the transfer elevator assembly 139 may include a transfer elevator 432 that includes a conveyor or rollers that is configured to receive the pallet having stacked containers, as well as a transverse conveyor, belts, or rollers configured to transfer empty pallets to a subsequent station, such as a pallet stacking station 140. The depalletizing station 130 may receive the pallet of stacked containers from an upstream station, such as via a conveyor of a check station 120.

In the example embodiment shown in FIG. 4, the plurality of fork assemblies 137 may comprise eight fork assemblies, which are arranged as four pairs of fork assemblies positioned on opposite sides of the frame 135. Each fork assembly may include one or more extension/retraction rods 460 coupled to a fork platform 464, and the one or more extension/retraction rods 460 may be movably or slidably coupled to a fork assembly bracket 462. One or more actuators may be associated with the one or more extension/retraction rods 460 and/or the fork assembly bracket 462 in order to move or slide the one or more extension/retraction rods 460 and the fork platform 464 substantially horizontally relative to the fork assembly bracket 462. The one or more actuators may comprise solenoids, pneumatic cylinders, hydraulic cylinders, other linear actuators, worm or screw drives, rack and pinion drives, other rotary actuators, or other types of actuators. The one or more extension/retraction rods 460, the fork platform 464, and the fork assembly bracket 462 may be formed of various materials, such as steel, aluminum, other metals, composites, plastics, or combinations thereof. Further aspects of example fork platforms 464 are shown and described herein in more detail at least with respect to FIGS. 5A-5C.

For each fork assembly, the one or more actuators associated with the one or more extension/retraction rods 460 and/or the fork assembly bracket 462 may cause the one or more extension/retraction rods 460 and the fork platform 464 to move or slide substantially horizontally between a retracted position in which the fork platform 464 does not engage, support, or contact any portion of containers, and an extended position (as shown in FIG. 4) in which the fork platform 464 engages, supports, or contacts structural ribs or edges associated with peripheries of containers.

In addition, each fork assembly bracket 462 may be movably or slidably coupled to one or more vertical supports 435 of the frame 135. One or more actuators may be associated with the fork assembly bracket 462 and/or the one or more vertical supports 435 in order to move or slide the fork assembly bracket 462, as well as the one or more extension/retraction rods 460 and the fork platform 464 coupled thereto, substantially vertically relative to the one or more vertical supports 435 of the frame 135. The one or more actuators may comprise solenoids, pneumatic cylinders, hydraulic cylinders, other linear actuators, worm or screw drives, rack and pinion drives, other rotary actuators, or other types of actuators. The one or more vertical supports 435, as well as other portions of the frame 135, may be formed of various materials, such as steel, aluminum, other metals, composites, plastics, or combinations thereof.

For each fork assembly, the one or more actuators associated with the fork assembly bracket 462 and/or the one or more vertical supports 435 may cause the fork assembly bracket 462, as well as the one or more extension/retraction rods 460 and the fork platform 464 coupled thereto, to move or slide substantially vertically relative to the frame 135 and the one or more vertical supports 435. Thus, when the one or more extension/retraction rods 460 and the fork platform 464 are in a retracted position that does not engage, support, or contact any portion of containers, the fork assembly may move or slide substantially vertically relative to the frame 135 and relative to any containers received within the frame 135. In addition, when the one or more extension/retraction rods 460 and the fork platform 464 are in an extended position that engages, supports, or contacts structural ribs or edges associated with peripheries of containers, the fork assembly may move or slide substantially vertically relative to the frame 135 and thereby lift or lower respective containers that are engaged by the one or more extension/retraction rods 460 and the fork platform 464.

As shown in FIG. 4, the plurality of fork assemblies 137 may comprise eight fork assemblies arranged as four pairs of fork assemblies positioned on opposite sides of the frame 135. The first pair of fork assemblies may comprise a first fork assembly including first extension/retraction rods 460-1, a first fork platform 464-1, and a first fork assembly bracket 462-1, and an opposing second fork assembly including second extension/retraction rods 460-2, a second fork platform 464-2, and a second fork assembly bracket 462-2. The second pair of fork assemblies may comprise a third fork assembly including third extension/retraction rods 460-3, a third fork platform 464-3, and a third fork assembly bracket 462-3, and an opposing fourth fork assembly including fourth extension/retraction rods 460-4, a fourth fork platform 464-4, and a fourth fork assembly bracket 462-4. The third pair of fork assemblies may comprise a fifth fork assembly including fifth extension/retraction rods 460-5, a fifth fork platform 464-5, and a fifth fork assembly bracket 462-5, and an opposing sixth fork assembly including sixth extension/retraction rods 460-6, a sixth fork platform 464-6, and a sixth fork assembly bracket 462-6. The fourth pair of fork assemblies may comprise a seventh fork assembly including seventh extension/retraction rods 460-7, a seventh fork platform 464-7, and a seventh fork assembly bracket 462-7, and an opposing eighth fork assembly including eighth extension/retraction rods 460-8, an eighth fork platform 464-8, and an eighth fork assembly bracket 462-8. In other example embodiments, other numbers or other groups or pairs of fork assemblies may be included in an example depalletizing station.

In the example embodiment shown in FIG. 4, the transfer elevator assembly 139 may comprise a transfer elevator 432, a transfer elevator frame 465, and one or more transfer elevator actuators 467. The transfer elevator 432 may comprise a segment, section, or portion of conveyor or rollers that is configured to receive a pallet having stacked containers, as well as a transverse conveyor, belts, or rollers configured to transfer empty pallets to a subsequent station, such as a pallet stacking station 140. In addition, the transfer elevator 432 may be movably coupled to the transfer elevator frame 465 via the one or more transfer elevator actuators 467. For example, the one or more transfer elevator actuators 467 may comprise four transfer elevator actuators 467-1, 467-2, 467-3, 467-4 that are each positioned at respective corners of the transfer elevator frame 465 and that are each coupled to respective portions of the transfer elevator 432. The transfer elevator actuators 467 may comprise belt drives, chain drives, pulley drives, solenoids, pneumatic cylinders, hydraulic cylinders, other linear actuators, worm or screw drives, rack and pinion drives, other rotary actuators, or other types of actuators. The transfer elevator frame 465 and portions of the transfer elevator 432 and transfer elevator actuators 467 may be formed of various materials, such as steel, aluminum, other metals, composites, plastics, or combinations thereof.

The one or more transfer elevator actuators 467 associated with the transfer elevator frame 465 and coupled to respective portions of the transfer elevator 432 may cause the transfer elevator 432 to move or slide substantially vertically relative to the transfer elevator frame 465 and the frame 135. Thus, the transfer elevator 432 may move or slide substantially vertically relative to the transfer elevator frame 465 and the frame 135 to support undersides of pallets, support undersides of containers, receive containers, and/or lift or lower containers. Further, the segment, section, or portion of conveyor or rollers of the transfer elevator 432 may actuate to receive pallets of stacked containers from an upstream station, receive containers released by fork assemblies, and/or transfer containers to a subsequent station such as a downstream station. Moreover, a transverse conveyor, belts, or rollers of the transfer elevator 432 may actuate to transfer empty pallets to a subsequent station such as a pallet stacking station.

In the example embodiment shown in FIG. 4, upon receiving a pallet of stacked containers within the frame 135, the plurality of fork assemblies 137 may be configured to engage individual layers of the stacked containers by moving from retracted positions to extended positions. For example, actuators associated with extension/retraction rods 460 and/or fork assembly brackets 462 may move or slide the extension/retraction rods 460 and fork platforms 464 on opposite sides of the frame 135 substantially horizontally from retracted positions to extended positions to engage respective layers of stacked containers. As shown in FIG. 4, four pairs of fork assemblies 137 may be associated with opposite sides of the frame 135 in order to engage four layers of stacked containers.

Upon engaging individual layers of the stacked containers, the plurality of fork assemblies 137 may lift or raise the layers of containers within the frame 135. For example, actuators associated with fork assembly brackets 462 and/or vertical supports 435 may move or slide the fork assembly brackets 462, as well as the extension/retraction rods 460 and fork platforms 464 coupled thereto, on opposite sides of the frame 135 substantially vertically to lift respective layers of containers. In this manner, all layers of containers may be lifted off the pallet, and individual layers of containers may be lifted different distances, e.g., each layer may be lifted such that a defined distance separates adjacent layers of containers.

Upon lifting all layers of containers off the pallet, the empty pallet may be transferred to a subsequent station such as the pallet stacking station 140. For example, the transverse conveyor, belts, or rollers of the transfer elevator 432 may be actuated to transfer the empty pallet from the depalletizing station 130 to the pallet stacking station 140.

Furthermore, upon lifting all layers of containers off the pallet, each layer of lifted containers may then be sequentially or individually, e.g., layer by layer, transferred to a downstream station 150. For example, the transfer elevator actuators 467 associated with the transfer elevator frame 465 may move or slide the transfer elevator 432 that is positioned under the layers of lifted containers substantially vertically relative to the transfer elevator frame 465 and the frame 135. The transfer elevator actuators 467 may move the transfer elevator 432 substantially vertically to support a lowest layer of lifted containers. In addition, actuators associated with fork assembly brackets 462 and/or vertical supports 435 may move or slide the fork assembly brackets 462, as well as the extension/retraction rods 460 and fork platforms 464 coupled thereto and the lowest layer of lifted containers, substantially vertically to lower the lowest layer of lifted containers toward the transfer elevator 432. Further, actuators associated with the extension/retraction rods 460 and/or fork assembly brackets 462 may move or slide the extension/retraction rods 460 and fork platforms 464 substantially horizontally from extended positions to retracted positions to release the lowest layer of lifted containers onto the transfer elevator 432. Then, the transfer elevator actuators 467 may move the transfer elevator 432 substantially vertically to align with the downstream station 150, and the segment, section, or portion of conveyor or rollers of the transfer elevator 432 may actuate to transfer the received lowest layer of lifted containers to the downstream station 150.

The operations of the transfer elevator assembly 139 and the plurality of fork assemblies 137 described above may repeat to transfer additional layers of lifted containers to the downstream station 150. Further aspects of an example depalletizing station 130 are shown and described herein in more detail at least with respect to FIGS. 5A-6H. In addition, other example embodiments of depalletizing stations are shown and described herein in more detail at least with respect to FIGS. 7A-9.

Figure 5A:
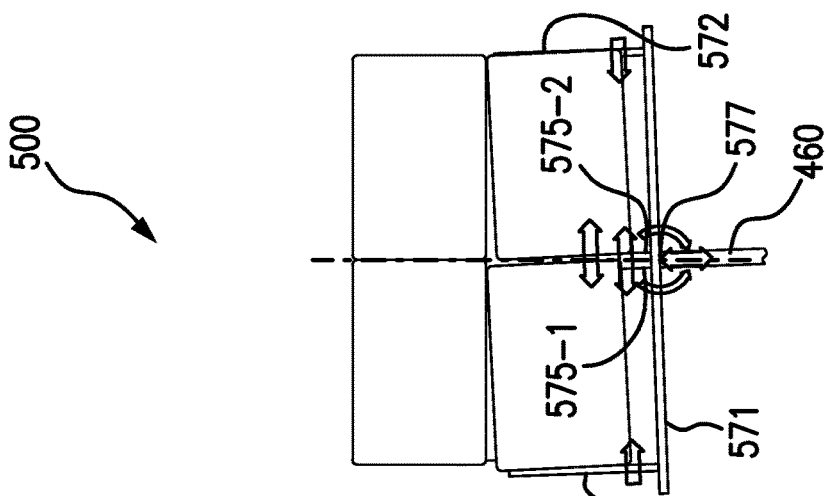
FIGS. 5A-5C are schematic, top view diagrams of example fork assemblies of a depalletizing station of a container depalletizing system, in accordance with implementations of the present disclosure.
Figure 5B:
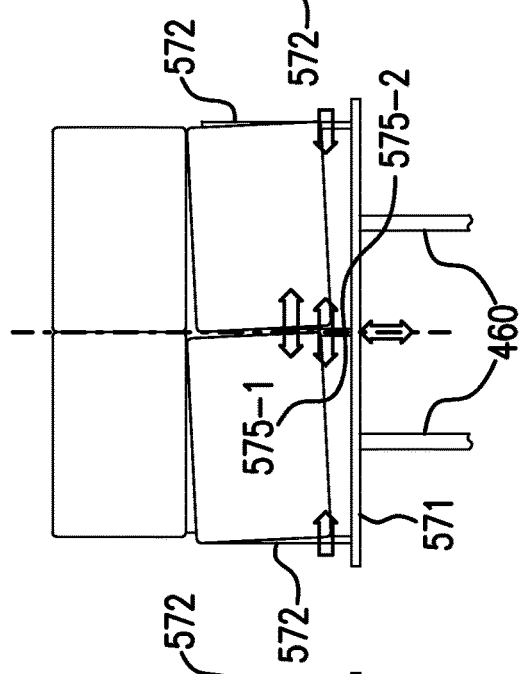
Figure 5C:
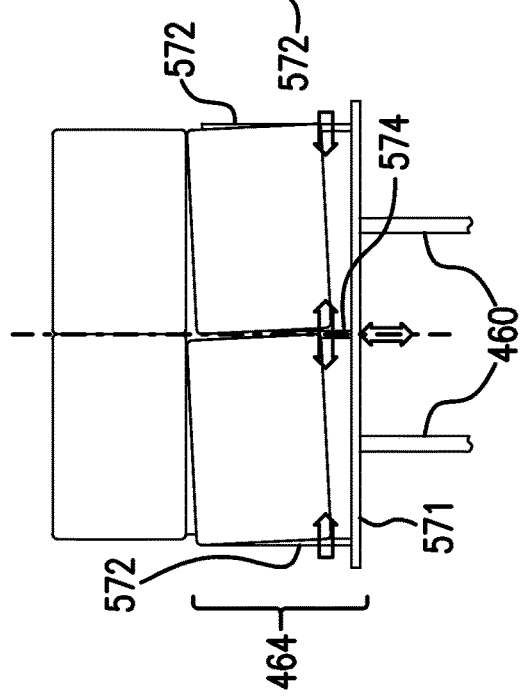

FIGS. 5A-5C are schematic, top view diagrams 500 of example fork assemblies of a depalletizing station of a container depalletizing system, in accordance with implementations of the present disclosure.

As shown in FIG. 5A, a portion of a fork assembly may include one or more extension/retraction rods 460 and an example fork platform 464. The example fork platform 464 of FIG. 5A may include a horizontal support bar 571 coupled to the extension/retraction rods 460, two outer forks 572 coupled to and extending from the horizontal support bar 571, and one inner fork 574 coupled to and extending from the horizontal support bar 571 between the two outer forks 572. The horizontal support bar 571, two outer forks 572, and one inner fork 574 may be formed of various materials, such as steel, aluminum, other metals, composites, plastics, or combinations thereof. In addition, the outer forks 572 and inner fork 574 may be substantially straight beams, rods, poles, struts, spars, or other structural support elements, and may include tapers to facilitate extension and retraction of the forks relative to containers.

The outer forks 572 and inner fork 574 may be configured to support structural ribs or edges associated with peripheries of containers. For example, the outer forks 572 may engage or support outer structural ribs or edges associated with outer peripheries of a layer of containers, and the inner fork 574 may engage or support inner structural ribs or edges associated with inner peripheries of a layer of containers.

In addition to the substantially horizontal movement or sliding of the extension/retraction rods 460 and fork platform 464 between an extended position and a retracted position responsive to actuation of one or more actuators associated with the extension/retraction rods 460 and/or a fork assembly bracket 462, individual ones of the outer forks 572 and the inner fork 574 may also move or slide substantially horizontally. For example, each of the outer forks 572 may move or slide substantially horizontally toward or away from the inner fork 574 in order to engage or support outer structural ribs or edges associated with outer peripheries of a layer of containers. In addition, the inner fork 574 may also move or slide substantially horizontally toward or away from respective outer forks 572 in order to engage or support inner structural ribs or edges associated with inner peripheries of a layer of containers. One or more actuators may be associated with individual ones of the outer forks 572 and/or the inner fork 574 to move or slide the forks, and the one or more actuators may include servos, solenoids, pneumatic cylinders, hydraulic cylinders, other linear actuators, worm or screw drives, rack and pinion drives, other rotary actuators, or other types of actuators.

As shown in FIG. 5B, a portion of a fork assembly may include one or more extension/retraction rods 460 and another example fork platform 464. The example fork platform 464 of FIG. 5B may include a horizontal support bar 571 coupled to the extension/retraction rods 460, two outer forks 572 coupled to and extending from the horizontal support bar 571, and two inner forks 575-1, 575-2 coupled to and extending from the horizontal support bar 571 between the two outer forks 572. The horizontal support bar 571, two outer forks 572, and two inner forks 575 may be formed of various materials, such as steel, aluminum, other metals, composites, plastics, or combinations thereof. In addition, the outer forks 572 and inner forks 575 may be substantially straight beams, rods, poles, struts, spars, or other structural support elements, and may include tapers to facilitate extension and retraction of the forks relative to containers.

The outer forks 572 and inner forks 575 may be configured to support structural ribs or edges associated with peripheries of containers. For example, the outer forks 572 may engage or support outer structural ribs or edges associated with outer peripheries of a layer of containers, and the inner forks 575 may engage or support inner structural ribs or edges associated with inner peripheries of a layer of containers.

In addition to the substantially horizontal movement or sliding of the extension/retraction rods 460 and fork platform 464 between an extended position and a retracted position responsive to actuation of one or more actuators associated with the extension/retraction rods 460 and/or a fork assembly bracket 462, individual ones of the outer forks 572 and the inner forks 575 may also move or slide substantially horizontally. For example, each of the outer forks 572 may move or slide substantially horizontally toward or away from the inner forks 575 in order to engage or support outer structural ribs or edges associated with outer peripheries of a layer of containers. In addition, each of the inner forks 575 may also move or slide substantially horizontally toward or away from respective outer forks 572 in order to engage or support inner structural ribs or edges associated with inner peripheries of a layer of containers. One or more actuators may be associated with individual ones of the outer forks 572 and/or the inner forks 575 to move or slide the forks, and the one or more actuators may include servos, solenoids, pneumatic cylinders, hydraulic cylinders, other linear actuators, worm or screw drives, rack and pinion drives, other rotary actuators, or other types of actuators.

As shown in FIG. 5C, a portion of a fork assembly may include an extension/retraction rod 460 and yet another example fork platform 464. The example fork platform 464 of FIG. 5C may include a horizontal support bar 571 coupled to the extension/retraction rod 460, two outer forks 572 coupled to and extending from the horizontal support bar 571, and two inner forks 575-1, 575-2 coupled to and extending from the horizontal support bar 571 between the two outer forks 572. The horizontal support bar 571, two outer forks 572, and two inner forks 575 may be formed of various materials, such as steel, aluminum, other metals, composites, plastics, or combinations thereof. In addition, the outer forks 572 and inner forks 575 may be substantially straight beams, rods, poles, struts, spars, or other structural support elements, and may include tapers to facilitate extension and retraction of the forks relative to containers.

The outer forks 572 and inner forks 575 may be configured to support structural ribs or edges associated with peripheries of containers. For example, the outer forks 572 may engage or support outer structural ribs or edges associated with outer peripheries of a layer of containers, and the inner forks 575 may engage or support inner structural ribs or edges associated with inner peripheries of a layer of containers.

In addition to the substantially horizontal movement or sliding of the extension/retraction rod 460 and fork platform 464 between an extended position and a retracted position responsive to actuation of one or more actuators associated with the extension/retraction rod 460 and/or a fork assembly bracket 462, individual ones of the outer forks 572 and the inner forks 575 may also move or slide substantially horizontally. For example, each of the outer forks 572 may move or slide substantially horizontally toward or away from the inner forks 575 in order to engage or support outer structural ribs or edges associated with outer peripheries of a layer of containers. In addition, each of the inner forks 575 may also move or slide substantially horizontally toward or away from respective outer forks 572 in order to engage or support inner structural ribs or edges associated with inner peripheries of a layer of containers. One or more actuators may be associated with individual ones of the outer forks 572 and/or the inner forks 575 to move or slide the forks, and the one or more actuators may include servos, solenoids, pneumatic cylinders, hydraulic cylinders, other linear actuators, worm or screw drives, rack and pinion drives, other rotary actuators, or other types of actuators.

Further, the example fork platform 464 of FIG. 5C may also include a pivotable joint 577 between the extension/retraction rod 460 and the horizontal support bar 571. The pivotable joint 577 may include a bearing, hinge, rotatable joint, flexible member, or other pivotable connection that is configured to enable rotation of the fork platform 464 relative to the extension/retraction rod 460. In some example embodiments, the pivotable joint 577 may be a passively rotatable joint that may rotate the fork platform 464 responsive to forces or pressures upon contact with portions of containers. In other example embodiments, the pivotable joint 577 may be an actively rotatable joint including one or more actuators configured to rotate the fork platform 464 relative to the extension/retraction rod 460, and the one or more actuators may comprise servos, gear drives, motors, or other rotary actuators. In this manner, the example fork platform 464 may be designed to include compliance or flexibility to engage or support portions of containers that may be offset and/or rotated within one or more thresholds or limits.

Various of the example fork platforms described with respect to FIGS. 5A-5C may be included in any of the example embodiments of depalletizing stations described herein. In other example embodiments, an example fork platform may include static or fixed outer forks and inner forks that may not be configured move or slide substantially horizontally. In addition, an example fork platform may include static or fixed inner forks and movable outer forks that are configured move or slide substantially horizontally. Various other modifications or combinations of features may be included in example fork platforms to engage or support layers of containers.

FIGS. 6A-6H are schematic, side view diagrams 600A-600H of an example sequence of operations of an example depalletizing station having a transfer elevator of a container depalletizing system, in accordance with implementations of the present disclosure.

As shown in FIGS. 6A-6H, an example depalletizing station may include a plurality of fork assemblies, including extension/retraction rods 460, fork platforms 464, and fork assembly brackets 462, and a transfer elevator assembly, including a transfer elevator 432 and transfer elevator actuators 467, that may depalletize a stack of containers 104.

As shown in FIG. 6A, actuators associated with extension/retraction rods 460 and/or fork assembly brackets 462 may move or slide opposing fork platforms 464 substantially horizontally from retracted positions to extended positions to engage respective layers of containers, and actuators associated with fork assembly brackets 462 and/or vertical supports of the frame may move or slide the opposing fork platforms 464 substantially vertically to lift or raise the respective layers of containers. In addition, each layer of containers may be separated from adjacent layers of containers by a defined distance or gap. Further, a pallet from which the layers of containers have been engaged and lifted may have been transferred away from the depalletizing station by a transverse conveyor or rollers associated with the transfer elevator 432. Furthermore, the transfer elevator actuators 467 may move or slide the transfer elevator 432 substantially vertically toward the lowest layer of lifted containers.

As shown in FIG. 6B, the transfer elevator actuators 467 may move or slide the transfer elevator 432 substantially vertically to support undersides of the lowest layer of lifted containers. In addition, actuators associated with fork assembly brackets 462 and/or vertical supports of the frame of the opposing fork platforms 464 that are engaged with the lowest layer of lifted containers may move or slide the opposing fork platforms 464 substantially vertically toward the transfer elevator 432. Then, actuators associated with extension/retraction rods 460 and/or fork assembly brackets 462 of the opposing fork platforms 464 that are engaged with the lowest layer of lifted containers may move or slide the opposing fork platforms 464 substantially horizontally from extended positions to retracted positions to release the lowest layer of lifted containers to the transfer elevator 432. Further, the transfer elevator actuators 467 may move or slide the transfer elevator 432 supporting a layer of containers substantially vertically to align with a downstream station, such as a downstream conveyor. Then, a conveyor or rollers associated with the transfer elevator 432 may actuate to transfer the layer of containers to the downstream station.

As shown in FIG. 6C, actuators associated with fork assembly brackets 462 and/or vertical supports of the frame of the opposing fork platforms 464 that released the lowest layer of lifted containers may move or slide the opposing fork platforms 464 substantially vertically toward a base of the frame. Then, the transfer elevator actuators 467 may move or slide the transfer elevator 432 substantially vertically to support undersides of the second lowest layer of lifted containers. In addition, actuators associated with fork assembly brackets 462 and/or vertical supports of the frame of the opposing fork platforms 464 that are engaged with the second lowest layer of lifted containers may move or slide the opposing fork platforms 464 substantially vertically toward the transfer elevator 432. Then, actuators associated with extension/retraction rods 460 and/or fork assembly brackets 462 of the opposing fork platforms 464 that are engaged with the second lowest layer of lifted containers may move or slide the opposing fork platforms 464 substantially horizontally from extended positions to retracted positions to release the second lowest layer of lifted containers to the transfer elevator 432.

As shown in FIG. 6D, the transfer elevator actuators 467 may move or slide the transfer elevator 432 supporting a layer of containers substantially vertically to align with a downstream station, such as a downstream conveyor. Then, a conveyor or rollers associated with the transfer elevator 432 may actuate to transfer the layer of containers to the downstream station. Further, actuators associated with fork assembly brackets 462 and/or vertical supports of the frame of the opposing fork platforms 464 that released the second lowest layer of lifted containers may move or slide the opposing fork platforms 464 substantially vertically toward a base of the frame.

As shown in FIG. 6E, the transfer elevator actuators 467 may move or slide the transfer elevator 432 substantially vertically to support undersides of the third lowest layer of lifted containers. In addition, actuators associated with fork assembly brackets 462 and/or vertical supports of the frame of the opposing fork platforms 464 that are engaged with the third lowest layer of lifted containers may move or slide the opposing fork platforms 464 substantially vertically toward the transfer elevator 432. Then, actuators associated with extension/retraction rods 460 and/or fork assembly brackets 462 of the opposing fork platforms 464 that are engaged with the third lowest layer of lifted containers may move or slide the opposing fork platforms 464 substantially horizontally from extended positions to retracted positions to release the third lowest layer of lifted containers to the transfer elevator 432.

As shown in FIG. 6F, the transfer elevator actuators 467 may move or slide the transfer elevator 432 supporting a layer of containers substantially vertically to align with a downstream station, such as a downstream conveyor. Then, a conveyor or rollers associated with the transfer elevator 432 may actuate to transfer the layer of containers to the downstream station. Further, actuators associated with fork assembly brackets 462 and/or vertical supports of the frame of the opposing fork platforms 464 that released the third lowest layer of lifted containers may move or slide the opposing fork platforms 464 substantially vertically toward a base of the frame.

As shown in FIG. 6G, the transfer elevator actuators 467 may move or slide the transfer elevator 432 substantially vertically to support undersides of the fourth lowest layer of lifted containers. In addition, actuators associated with fork assembly brackets 462 and/or vertical supports of the frame of the opposing fork platforms 464 that are engaged with the fourth lowest layer of lifted containers may move or slide the opposing fork platforms 464 substantially vertically toward the transfer elevator 432. Then, actuators associated with extension/retraction rods 460 and/or fork assembly brackets 462 of the opposing fork platforms 464 that are engaged with the fourth lowest layer of lifted containers may move or slide the opposing fork platforms 464 substantially horizontally from extended positions to retracted positions to release the fourth lowest layer of lifted containers to the transfer elevator 432.

As shown in FIG. 6H, the transfer elevator actuators 467 may move or slide the transfer elevator 432 supporting a layer of containers substantially vertically to align with a downstream station, such as a downstream conveyor. Then, a conveyor or rollers associated with the transfer elevator 432 may actuate to transfer the layer of containers to the downstream station. Further, actuators associated with fork assembly brackets 462 and/or vertical supports of the frame of the opposing fork platforms 464 that released the fourth lowest layer of lifted containers may move or slide the opposing fork platforms 464 substantially vertically toward a base of the frame.

Using the sequence of operations as described with respect to FIGS. 6A-6H, a stack of containers may be depalletized using an example depalletizing station including a plurality of fork assemblies and a transfer elevator assembly, by engaging, lifting, supporting, releasing, lowering, and transferring individual containers, layer by layer, of a stack of containers to one or more downstream stations or processes.

FIGS. 7A-7B are schematic, side view diagrams 700A and 700B of an example sequence of operations of an example movable depalletizing station of a container depalletizing system, in accordance with implementations of the present disclosure.

As shown in FIGS. 7A-7B, the example container depalletizing system may include a reorientation station 110, a check station 120, a bypass station (not shown), a depalletizing station 130, a pallet stacking station (not shown), and a downstream station 150. Certain portions of the example container depalletizing system, e.g., bypass station and pallet stacking station, are not shown in FIGS. 7A-7B for clarity.

The reorientation station 110, the check station 120, the bypass station (not shown), the pallet stacking station (not shown), and the downstream station 150 of the example container depalletizing system of FIGS. 7A-7B may include any and all features of such stations described herein with respect to at least FIGS. 1-3. Further, the example depalletization station 130 shown in FIGS. 7A-7B may also include any and all features of example depalletization stations described herein with respect to at least FIGS. 1, 2, and 4-6H, including but not limited to a frame and a plurality of fork assemblies configured to depalletize stacks of containers.

In contrast to the example depalletization station described with respect to at least FIGS. 4-6H, the example depalletization station 130 of FIGS. 7A-7B may not include a transfer elevator assembly. Instead, the example depalletization station 130 of FIGS. 7A-7B may comprise a movable or translatable depalletization station 130. The movable depalletization station 130 may include a movable or translatable frame 735 and a plurality of fork assemblies 137.

The movable or translatable frame 735 may include one or more wheels, rollers, bearings, or other linearly movable, rotatable, or slidable elements 780, which may interface with or contact one or more rails, tracks, guides, surfaces, or other paths along which the movable frame 735 may move between a first position and a second position. In addition, one or more actuators may be associated with the one or more wheels, rollers, bearings, or other linearly movable, rotatable, or slidable elements 780 and/or the one or more rails, tracks, guides, surfaces, or other paths, and the one or more actuators may include pneumatic cylinders, hydraulic cylinders, other linear actuators, worm or screw drives, rack and pinion drives, motors, other rotary actuators, or other types of actuators. At the first position, the movable frame 735 may receive a pallet 102 of stacked containers 104, the plurality of fork assemblies 137 may engage and lift respective layers of containers from the stack of containers 104, and an empty pallet 102 may be transferred to a subsequent station such as a pallet stacking station. At the second position, the movable frame 735 may sequentially lower and release containers, layer by layer, by the plurality of fork assemblies 137 to a downstream station 150, such as a downstream conveyor 152 having one or more rails, guides, or guards 154, thereby depalletizing the stack of containers 104.

As shown in FIG. 7A, the movable frame 735 may be positioned at a first position including a conveyor or rollers 132 that is configured to receive a pallet 102 having stacked containers 104, and a transverse conveyor, belts, or rollers 134 that is configured to transfer an empty pallet to a subsequent station. The movable frame 735 may receive the pallet 102 of stacked containers 104 at the first position from the conveyor 122 of the check station 120. The plurality of fork assemblies 137 may actuate extension/retraction rods and/or fork platforms to move substantially horizontally from retracted positions to extended positions to engage or support respective layers of containers 104. Then, the plurality of fork assemblies 137 may actuate fork assembly brackets and/or vertical supports to lift the extension/retraction rods, fork platforms, and respective layers of containers substantially vertically away from the pallet 102 and/or to a height sufficient to avoid interference or conflict with a downstream station such as downstream conveyor 152. In example embodiments, the downstream station or conveyor 152 may be positioned at various other heights relative to the depalletizing station. Then, the transverse conveyor, belts, or rollers 134 may actuate to transfer the empty pallet 102 to a subsequent station.

Upon engaging and lifting respective layers of containers 104 from a stack of containers by the plurality of fork assemblies 137, the movable frame 735 may move from the first position, as shown in FIG. 7A, to a second position, as shown in FIG. 7B. For example, one or more actuators associated with the one or more wheels, rollers, bearings, or other linearly movable, rotatable, or slidable elements 780 and/or the one or more rails, tracks, guides, surfaces, or other paths may move or slide the movable frame 735, as well as the layers of containers 104 engaged and lifted by the plurality of fork assemblies 137, from the first position to the second position. In some example embodiments, to facilitate movement of the movable frame 735 between the first position and the second position, portions of a transverse conveyor, belts, or rollers 134, as shown in FIG. 1, may include respective gaps to allow portions of the movable frame 735 to pass through such gaps between the first position and the second position. In other example embodiments, to facilitate movement of the movable frame 735 between the first position and the second position, portions of a transverse conveyor, belts, or rollers 134, as shown in FIG. 1, may be configured to retract into the ground surface to allow portions of the movable frame 735 to pass over such portions of the transverse conveyor between the first position and the second position. In further example embodiments, to facilitate movement of the movable frame 735 between the first position and the second position, the pallet stacking station may be positioned substantially parallel to and under the downstream station 150 to maintain unobstructed paths for portions of the movable frame 735 to move between the first position and the second position.

As shown in FIG. 7B, the movable frame 735 may be positioned at the second position substantially over a downstream station 150 such as a downstream conveyor 152 that is configured to receive depalletized containers 104 and to transfer the containers 104 to one or more subsequent stations. The movable frame 735 may position the layers of containers 104 engaged and lifted by the plurality of fork assemblies 137 at the second position substantially over the downstream conveyor 152. The plurality of fork assemblies 137 may actuate fork assembly brackets and/or vertical supports to lower the extension/retraction rods, fork platforms, and respective layers of containers, layer by layer, substantially vertically toward the downstream conveyor 152. Then, the plurality of fork assemblies 137 may actuate extension/retraction rods and/or fork platforms to move substantially horizontally from extended positions to retracted positions, layer by layer, to release respective layers of containers 104 onto the downstream conveyor 152. Then, the downstream conveyor 152 may actuate to transfer the depalletized containers 104 to one or more subsequent stations such as various downstream stations or processes.

Upon releasing all respective layers of containers 104 onto the downstream conveyor 152 by the plurality of fork assemblies 137, the movable frame 735 may move back from the second position, as shown in FIG. 7B, to the first position, as shown in FIG. 7A. For example, one or more actuators associated with the one or more wheels, rollers, bearings, or other linearly movable, rotatable, or slidable elements 780 and/or the one or more rails, tracks, guides, surfaces, or other paths may move or slide the movable frame 735, as well as the plurality of fork assemblies 137, from the second position to the first position. Then, the sequence of operations described herein with respect to FIGS. 7A and 7B may repeat to depalletize a subsequent stack of containers.

Figure 8:
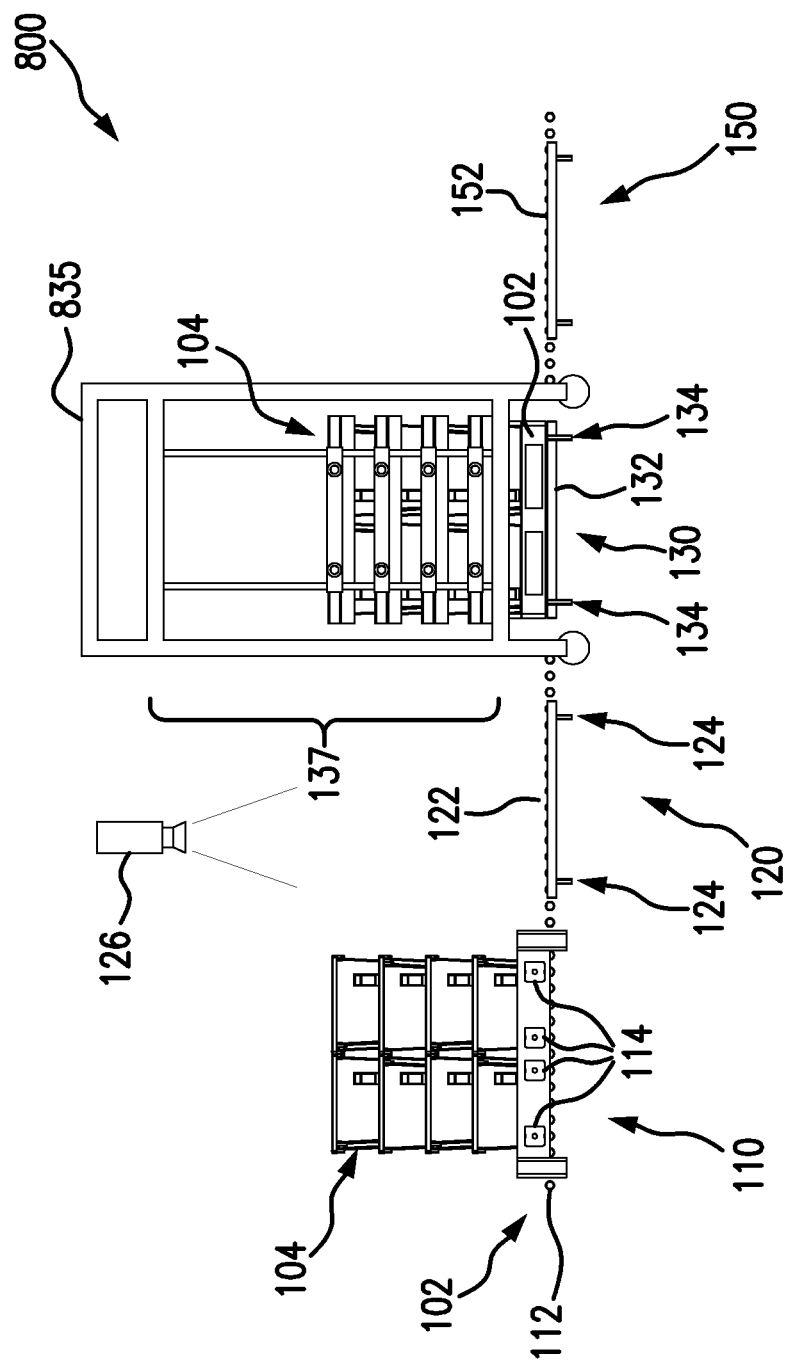
FIG. 8 is a schematic, side view diagram of an example single, stationary depalletizing station of a container depalletizing system, in accordance with implementations of the present disclosure.

FIG. 8 is a schematic, side view diagram 800 of an example single, stationary depalletizing station of a container depalletizing system, in accordance with implementations of the present disclosure.

As shown in FIG. 8, the example container depalletizing system may include a reorientation station 110, a check station 120, a bypass station (not shown), a depalletizing station 130, a pallet stacking station (not shown), and a downstream station 150. Certain portions of the example container depalletizing system, e.g., bypass station and pallet stacking station, are not shown in FIG. 8 for clarity.

The reorientation station 110, the check station 120, the bypass station (not shown), the pallet stacking station (not shown), and the downstream station 150 of the example container depalletizing system of FIG. 8 may include any and all features of such stations described herein with respect to at least FIGS. 1-3. In addition, the downstream station 150 or downstream conveyor 152 may be positioned at substantially a same height as other conveyors 112, 122, 132 of the example container depalletizing system of FIG. 8. In other example embodiments, the downstream station 150 or downstream conveyor 152 may be positioned at various other heights relative to the depalletizing station. Further, the example depalletization station 130 shown in FIG. 8 may also include any and all features of example depalletization stations described herein with respect to at least FIGS. 1, 2, and 4-7B, including but not limited to a frame and a plurality of fork assemblies configured to depalletize stacks of containers.

In contrast to the example depalletization station described with respect to at least FIGS. 4-6H, the example depalletization station 130 of FIG. 8 may not include a transfer elevator assembly, and in contrast to the example depalletization station described with respect to at least FIGS. 7A-7B, the example depalletization station 130 of FIG. 8 may not be movable, slidable, or translatable. Instead, the example depalletization station 130 of FIG. 8 may comprise a stationary depalletization station 130. The stationary depalletization station 130 may include a stationary frame 835 and a plurality of fork assemblies 137.

At the stationary depalletization station 130, the stationary frame 835 may receive a pallet 102 of stacked containers 104, the plurality of fork assemblies 137 may engage and lift respective layers of containers from the stack of containers 104, and an empty pallet 102 may be transferred to a subsequent station such as a pallet stacking station. Then, the stationary frame 835 may sequentially lower and release containers, layer by layer, by the plurality of fork assemblies 137 to a conveyor 132 under the containers 104 at the stationary depalletization station 130, and the conveyor 132 may transfer the containers 104 to a downstream station 150, such as a downstream conveyor 152, thereby depalletizing the stack of containers 104.

As shown in FIG. 8, the stationary frame 835 may be positioned over a conveyor or rollers 132 that is configured to receive a pallet 102 having stacked containers 104, and a transverse conveyor, belts, or rollers 134 that is configured to transfer an empty pallet to a subsequent station. The stationary frame 835 may receive the pallet 102 of stacked containers 104 from the conveyor 122 of the check station 120. The plurality of fork assemblies 137 may actuate extension/retraction rods and/or fork platforms to move substantially horizontally from retracted positions to extended positions to engage or support respective layers of containers 104. Then, the plurality of fork assemblies 137 may actuate fork assembly brackets and/or vertical supports to lift the extension/retraction rods, fork platforms, and respective layers of containers substantially vertically away from the pallet 102. Then, the transverse conveyor, belts, or rollers 134 may actuate to transfer the empty pallet 102 to a subsequent station.

Upon engaging and lifting respective layers of containers 104 from a stack of containers by the plurality of fork assemblies 137 and transferring the empty pallet 102 away from the depalletization station 130, the plurality of fork assemblies 137 may actuate fork assembly brackets and/or vertical supports to lower the extension/retraction rods, fork platforms, and respective layers of containers, layer by layer, substantially vertically toward the conveyor 132. Then, the plurality of fork assemblies 137 may actuate extension/retraction rods and/or fork platforms to move substantially horizontally from extended positions to retracted positions, layer by layer, to release respective layers of containers 104 onto the conveyor 132. Then, the conveyor 132 may actuate to transfer the depalletized containers 104 to the downstream station 150 or downstream conveyor 152, and the downstream conveyor 152 may also actuate to transfer the depalletized containers 104 to one or more subsequent stations such as various downstream stations or processes. Then, the sequence of operations described herein with respect to FIG. 8 may repeat to depalletize a subsequent stack of containers.

Figure 9:
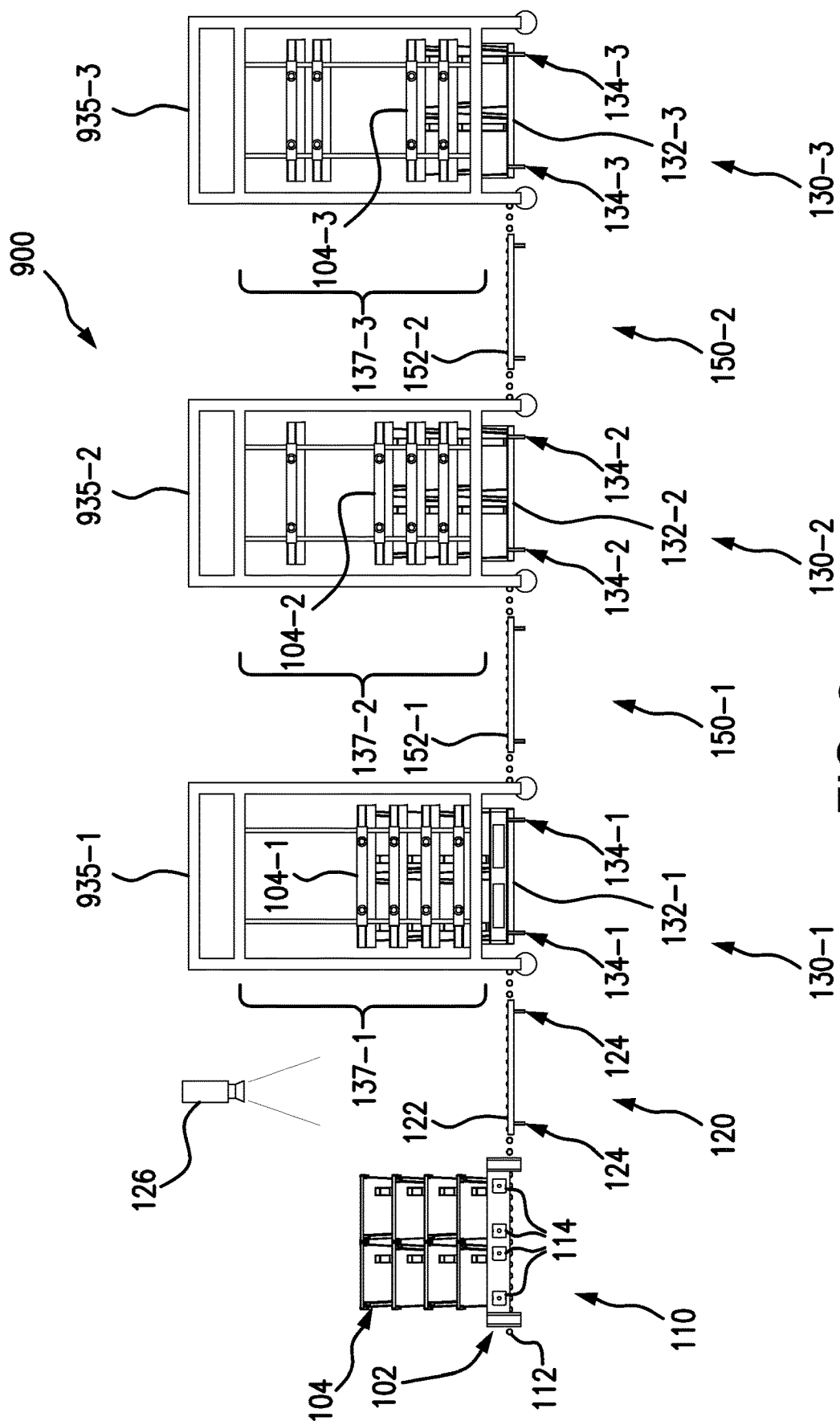
FIG. 9 is a schematic, side view diagram of example multiple, stationary depalletizing stations of a container depalletizing system, in accordance with implementations of the present disclosure.

FIG. 9 is a schematic, side view diagram 900 of example multiple, stationary depalletizing stations of a container depalletizing system, in accordance with implementations of the present disclosure.

As shown in FIG. 9, the example container depalletizing system may include a reorientation station 110, a check station 120, a bypass station (not shown), a plurality of depalletizing stations 130, a plurality of pallet stacking stations (not shown), and a plurality of downstream stations 150. Certain portions of the example container depalletizing system, e.g., bypass station and pallet stacking stations, are not shown in FIG. 9 for clarity.

The reorientation station 110, the check station 120, the bypass station (not shown), the plurality of pallet stacking stations (not shown), and the plurality of downstream stations 150 of the example container depalletizing system of FIG. 9 may include any and all features of such stations described herein with respect to at least FIGS. 1-3 and 8. In addition, the plurality of downstream stations 150 or downstream conveyors 152 may be positioned at substantially a same height as other conveyors 112, 122, 132 of the example container depalletizing system of FIG. 9. In other example embodiments, the downstream station 150 or downstream conveyor 152 may be positioned at various other heights relative to the depalletizing station. Further, the example plurality of depalletization stations 130 shown in FIG. 9 may also include any and all features of example depalletization stations described herein with respect to at least FIGS. 1, 2, and 4-8, including but not limited to frames and respective pluralities of fork assemblies configured to depalletize stacks of containers.

In contrast to the example depalletization station described with respect to at least FIGS. 4-6H, the example plurality of depalletization stations 130 of FIG. 9 may not include a transfer elevator assembly, and in contrast to the example depalletization station described with respect to at least FIGS. 7A-7B, the example plurality of depalletization stations 130 of FIG. 9 may not be movable, slidable, or translatable. Instead, the example plurality of depalletization stations 130 of FIG. 9 may comprise stationary depalletization stations 130 similar to the stationary depalletization station 130 described with respect to FIG. 8. The plurality of stationary depalletization stations 130 may include stationary frames 935 and respective pluralities of fork assemblies 137.

As shown in FIG. 9, the example container depalletization system may include three depalletization stations 130-1, 130-2, 130-3 including respective conveyors 132-1, 132-2, 132-3 configured to transfer pallets and containers and respective transverse conveyors 134-1, 134-2, 134-3 configured to transfer empty pallets. In addition, the three depalletization stations 130-1, 130-2, 130-3 may include respective stationary frames 935-1, 935-2, 935-3 and respective pluralities of fork assemblies 137-1, 137-2, 137-3 configured to receive and depalletize respective stacks of containers 104-1, 104-2, 104-3. Further, as shown in FIG. 9, the example container depalletization system may include two or more downstream stations 150-1, 150-2 including respective downstream conveyors 152-1, 152-2.

At each stationary depalletization station 130 of the plurality of depalletization stations 130, the stationary frame 935 may receive a pallet of stacked containers 104, the plurality of fork assemblies 137 may engage and lift respective layers of containers from the stack of containers 104, and an empty pallet may be transferred to a subsequent station such as a pallet stacking station. Then, the stationary frame 935 may sequentially lower and release containers, layer by layer, by the plurality of fork assemblies 137 to a conveyor 132 under the containers 104 at the stationary depalletization station 130, and the conveyor 132 may transfer the containers 104 to a downstream station 150, such as a downstream conveyor 152, thereby depalletizing the stack of containers 104. Various operations of each stationary depalletization station 130 may be performed as described with respect to at least FIG. 8.

In some example embodiments, the example container depalletizing system of FIG. 9 may utilize a plurality of depalletizing stations 130 to depalletize a single stack of containers. For example, a first depalletizing station 130 may engage and lift a highest layer of containers from a stack of containers, a second depalletizing station 130 may engage and lift a second highest layer of containers from the stack of containers, a third depalletizing station 130 may engage and lift a third highest layer of containers from the stack of containers, a fourth depalletizing station 130 may engage and lift a fourth highest layer of containers from a stack of containers, and an empty pallet may be transferred away from the fourth depalletizing station 130. Then, each of the depalletizing stations 130 may lower and release respective layers of containers to be transferred to downstream stations or processes.

In other example embodiments, each of a plurality of depalletizing stations 130 of the example container depalletizing system of FIG. 9 may engage and lift various numbers of layers of containers from a stack of containers, such as one layer, two layers, three layers, or other numbers of layers.

In still other example embodiments, each of a plurality of depalletizing stations 130 of the example container depalletizing system of FIG. 9 may operate substantially independently of other depalletizing stations 130 to depalletize respective stacks of containers, similar to the operations of the depalletizing station 130 described with respect to FIG. 8, but with a plurality of such depalletizing stations 130 operating in tandem, series, or parallel.

In further example embodiments, various sortation, reordering, or rearrangement of depalletized containers may be performed using a plurality of depalletizing stations 130. For example, individual depalletizing stations 130 of a plurality of depalletizing stations 130 may selectively engage and lift one or more layers of containers in a particular sequence or order, and individual depalletizing stations 130 of a plurality of depalletizing stations 130 may also selectively lower and release one or more layers of containers in a particular sequence or order such that the depalletized containers are transferred to downstream stations or processes in a particular desired sequence or order.

Various combinations of the different operations described above may be implemented using a plurality of depalletizing stations 130. Furthermore, operations of each of the plurality of depalletizing stations 130 may be dynamically changed over time, e.g., based on processing requirements of the example container depalletizing system.

In still further example embodiments, an example depalletizing station may include other types of gripping assemblies in place of or in combination with the plurality of fork assemblies described herein. For example, other types of gripping assemblies may utilize suction or vacuum pressure, electromagnetism, or other types of gripping or grasping fingers, arms, plates, surfaces, or other elements, to engage, lift, lower, and release containers.

In some example embodiments that may utilize suction or vacuum pressure, a plurality of gripping assemblies may contact and adhere to side and/or top surfaces of containers via suction or vacuum pressure to engage, lift, lower, and release containers, and the operations of such gripping assemblies using suction or vacuum pressure may depend upon various characteristics of the containers, such as shapes, sizes, surfaces, materials, and/or weights. In other example embodiments that may utilize electromagnetism, a plurality of gripping assemblies may contact and adhere to side and/or top surfaces of containers via magnetic forces between magnets, electromagnets, and magnetic materials to engage, lift, lower, and release containers, and the operations of such gripping assemblies using electromagnetism may also depend upon various characteristics of the containers, such as shapes, sizes, surfaces, materials, magnetic sections or portions, and/or weights. In further example embodiments that may utilize other types of gripping or grasping features or elements, a plurality of gripping assemblies may contact, engage, and support various features associated with edges, lips, corners, side surfaces, and/or bottom surfaces of containers via various fingers, arms, plates, surfaces, or other elements to engage, lift, lower, and release containers, and the operations of such gripping assemblies using other gripping or grasping elements may also depend upon various characteristics of the containers, such as shapes, sizes, edges, corners, surfaces, surface features, materials, and/or weights.

Figure 10:
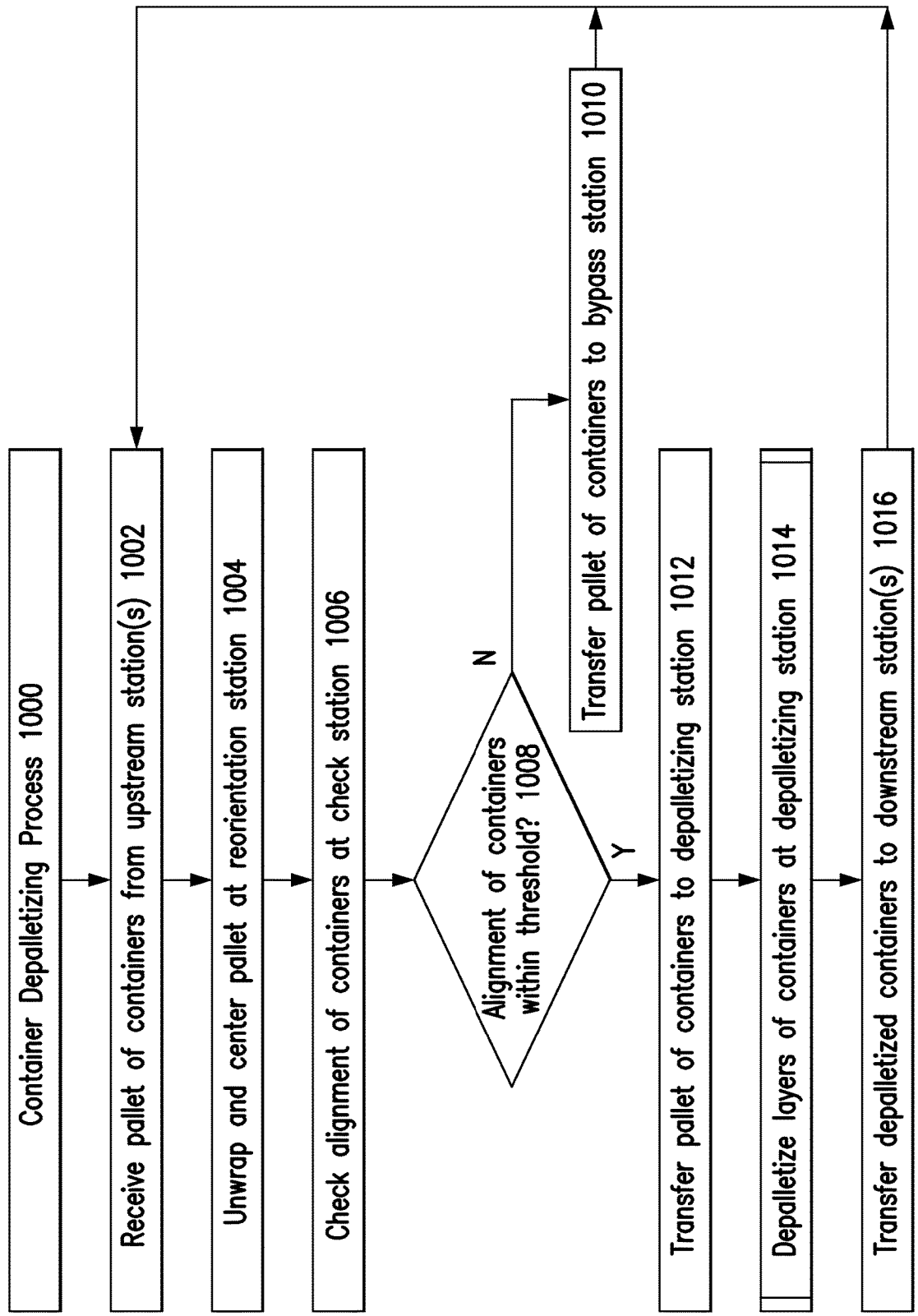
FIG. 10 is a flow diagram illustrating an example container depalletizing process, in accordance with implementations of the present disclosure.

FIG. 10 is a flow diagram illustrating an example container depalletizing process 1000, in accordance with implementations of the present disclosure.

The process 1000 may begin by receiving a pallet of containers from one or more upstream stations, as at 1002. For example, a forklift, robotic arm, gantry system, other robotic or automated machine or apparatus, an upstream conveyor, or other material handling equipment may transfer a pallet of stacked containers from an upstream station or process to a reorientation station of a container depalletizing system. The pallet may include a plurality of stacked containers, such as twelve, sixteen, or other numbers of stacked totes, bins, boxes, crates, trays, or other types of containers.

Further, a controller may instruct transfer of a pallet of stacked containers from an upstream station or process to a reorientation station, e.g., onto a conveyor or rollers associated with the reorientation station of a container depalletizing system.

The process 1000 may continue by unwrapping and centering the pallet at the reorientation station, as at 1004. For example, one or more agents, e.g., human or automated agents, may remove wrapping, film, cardboard, straps, or other container packaging or restraining components attached to or surrounding the pallet of stacked containers. In addition, the pallet may be centered with respect to the reorientation station and/or the conveyor or rollers associated with the reorientation station, by one or more actuators and associated alignment plates. Further, a controller may instruct the one or more agents to unwrap the pallet of stacked containers, and the controller may instruct the one or more actuators and associated alignment plates to contact, push, align, and/or center the pallet with respect to the reorientation station and/or the conveyor or rollers associated with the reorientation station. Moreover, the controller may instruct transfer of the pallet of stacked containers from the reorientation station to a check station, e.g., by instructing actuation of conveyors or rollers associated with the reorientation station and/or the check station.

The process 1000 may proceed by checking alignment of containers at the check station, as at 1006. For example, one or more sensors, such as imaging sensors, cameras, infrared sensors, depth sensors, 2D or 3D imaging devices, or other types of imaging devices may capture imaging data of the pallet of stacked containers, and the imaging data may be processed using various image processing techniques or algorithms to determine offsets and/or rotations of one or more containers relative to expected positions and/or orientations of stacked containers. Further, a controller may instruct capture of imaging data by the one or more imaging devices associated with the check station, and the controller may receive and process the imaging data using various image processing techniques or algorithms to determine offsets and/or rotations of one or more containers.

The process 1000 may then continue to determine whether the alignment of containers is within one or more thresholds, as at 1008. For example, the determined offsets and/or rotations of one or more containers, based on processing of the imaging data, may be compared with various thresholds or limits associated with maximum offsets and/or rotations relative to expected positions and/or orientations of stacked containers. In example embodiments, a container depalletizing system may be configured to process stacks of containers having maximum offsets and/or rotations of one or more containers of up to approximately 50 mm from expected positions and/or orientations of stacked containers. In other example embodiments, a container depalletizing system may be configured to process stacks of containers having thresholds or limits associated with maximum offsets and/or rotations that may be less than or greater than approximately 50 mm. Further, a controller may compare the determined offsets and/or rotations of one or more containers with the various thresholds or limits to determine whether the alignment of containers is within the one or more thresholds or limits.

If it is determined that the alignment of containers is not within the one or more thresholds or limits, then the process 1000 may proceed to transfer the pallet of containers to a bypass station, as at 1010. For example, the pallet of containers may be transferred by a transverse conveyor or rollers associated with the check station to a bypass station, at which one or more agents, e.g., human or automated agents, may perform various actions to correct the alignment of the stack of containers. Alternatively, the stack of containers may be depalletized by manual or other processes at the bypass station or further downstream stations. Further, a controller may instruct actuation of a transverse conveyor or rollers to transfer the pallet of containers from the check station to the bypass station. The process 1000 may then return to step 1002 to receive a next pallet of stacked containers at a reorientation station of the container depalletizing system.

If, however, it is determined that the alignment of containers is within the one or more thresholds or limits, then the process 1000 may continue with transferring the pallet of containers to a depalletizing station, as at 1012. For example, the pallet of stacked containers may be transferred by a conveyor or rollers associated with the check station to a depalletizing station, various example embodiments of which are described herein. Further, a controller may instruct transfer of the pallet of stacked containers from the check station to the depalletizing station, e.g., by instructing actuation of conveyors or rollers associated with the check station and/or the depalletizing station.

The process 1000 may then proceed with depalletizing layers of containers at the depalletizing station, as at 1014. Various example embodiments of depalletizing stations and operations associated therewith are described herein. For example, the depalletizing stations may include various types of frames, which may be either stationary or movable, a plurality of fork assemblies configured to engage, lift, lower, and/or release layers of containers, and/or conveyors, rollers, or transfer elevator assemblies configured to support, receive, and/or transfer layers of containers to one or more downstream stations or processes. The various example embodiments of depalletizing stations may depalletize stacks of containers, layer by layer, and transfer the containers to various downstream stations or processes. Further, a controller may instruct the operations of example embodiments of depalletizing stations to depalletize stacks of containers, e.g., by instructing operations of the pluralities of fork assemblies, by instructing operations of conveyors, rollers, or transfer elevator assemblies, by instructing movement, sliding, or translation of movable frames, and/or by instructing various other operations.

The process 1000 may then continue by transferring depalletized containers to one or more downstream stations, as at 1016. For example, containers may be depalletized from a stack of containers, layer by layer, at the depalletizing station, and the containers may be transferred by a conveyor, rollers, or a transfer elevator assembly to one or more downstream stations or processes. Further, a controller may instruct operations of the conveyor, rollers, or the transfer elevator assembly to transfer the depalletized containers to one or more downstream stations or processes. The process 1000 may then return to step 1002 to receive a next pallet of stacked containers at a reorientation station of the container depalletizing system.

Figure 11:
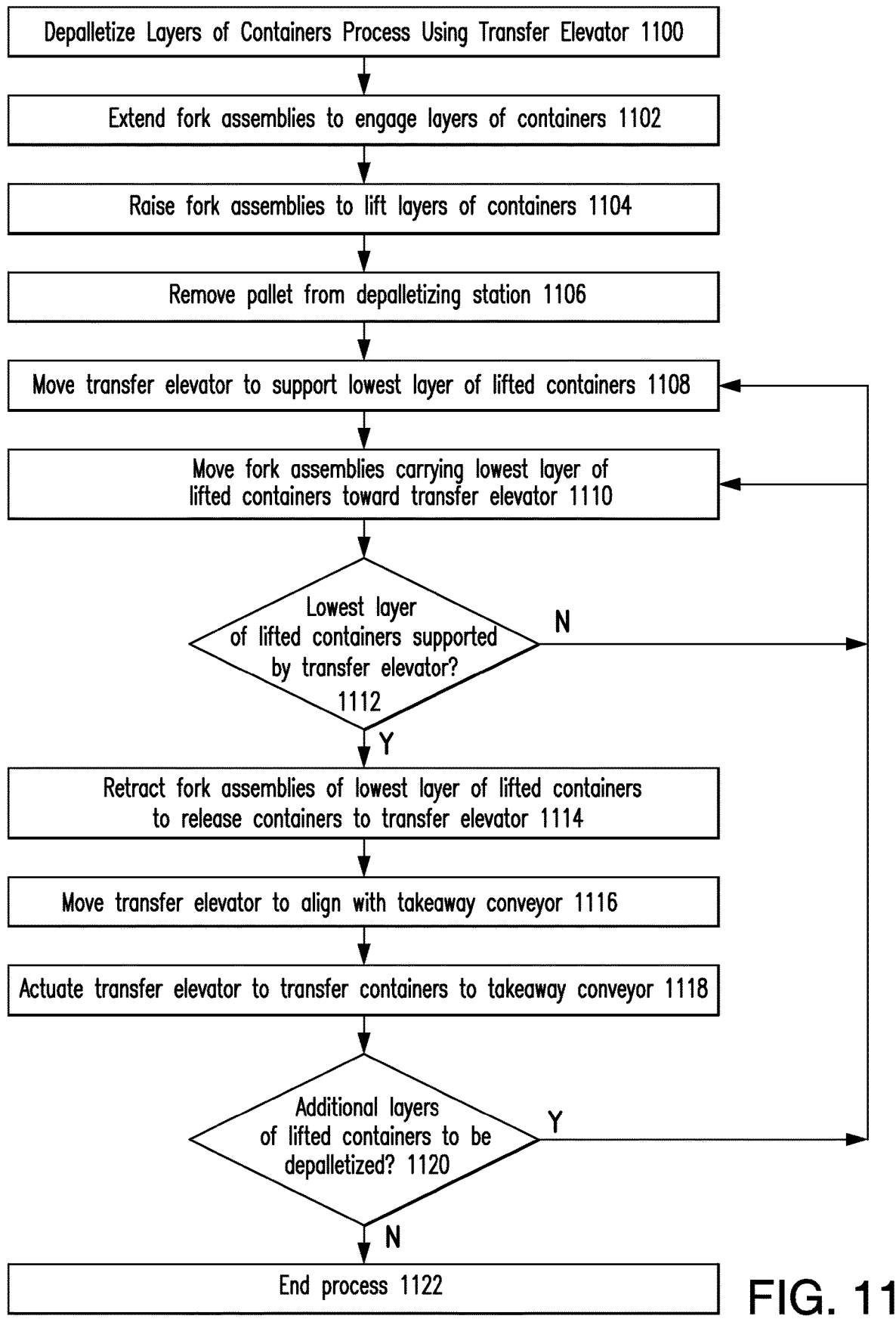
FIG. 11 is a flow diagram illustrating an example depalletize layers of containers process using a transfer elevator, in accordance with implementations of the present disclosure.

FIG. 11 is a flow diagram illustrating an example depalletize layers of containers process using a transfer elevator 1100, in accordance with implementations of the present disclosure. For example, the process 1100 may include a sequence of operations that may be performed by the example depalletizing station described herein with respect to at least FIGS. 4-6H. In addition, the process 1100 may comprise an example set of process steps associated with step 1014 of FIG. 10.

The process 1100 may begin by extending fork assemblies to engage layers of containers, as at 1102. For example, a plurality of fork assemblies may engage respective layers of containers of a stack of containers by moving the fork assemblies substantially horizontally from retracted positions to extended positions. As described herein, the plurality of fork assemblies may include extension/retraction rods, fork platforms, and fork assembly brackets, and the extension/retraction rods and fork platforms may be moved substantially horizontally from retracted positions to extended positions by one or more actuators associated with the extensions/retraction rods and/or the fork assembly brackets. Further, a controller may instruct actuation of the one or more actuators to move the extension/retraction rods and fork platforms substantially horizontally from the retracted positions to the extended positions to engage respective layers of containers.

The process 1100 may continue by raising fork assemblies to lift layers of containers, as at 1104. For example, the plurality of fork assemblies may raise or lift respective layers of containers by moving the fork assemblies substantially vertically relative to the frame and/or away from the pallet under the layers of containers. As described herein, the plurality of fork assemblies may include extension/retraction rods, fork platforms, and fork assembly brackets, and the frame may include vertical supports to which the fork assembly brackets are movably coupled. The extension/retraction rods and fork platforms may be moved substantially vertically relative to the frame by one or more actuators associated with the fork assembly brackets and/or the vertical supports. Further, a controller may instruct actuation of the one or more actuators to move the extension/retraction rods and fork platforms substantially vertically relative to the frame to raise or lift respective layers of containers.

The process 1100 may proceed by removing the pallet from the depalletizing station, as at 1106. For example, upon raising or lifting all layers of containers by the plurality of fork assemblies away from the pallet, the empty pallet may be transferred to a subsequent station such as a pallet stacking station. In addition, a transverse conveyor or rollers associated with the depalletizing station may transfer the empty pallet away from the depalletizing station. Further, a controller may instruct actuation of the transverse conveyor or rollers to transfer the empty pallet from the depalletizing station to a subsequent station.

The process 1100 may continue to move a transfer elevator to support a lowest layer of lifted containers, as at 1108. For example, a transfer elevator may move substantially vertically relative to the frame to contact or support a lowest layer of lifted containers that have been engaged and lifted by the plurality of fork assemblies. As described herein, a transfer elevator assembly may include a transfer elevator frame, a transfer elevator, and one or more transfer elevator actuators configured to move the transfer elevator substantially vertically relative to the transfer elevator frame. Further, a controller may instruct actuation of the one or more transfer elevator actuators to move the transfer elevator substantially vertically relative to the frame to contact or support the lowest layer of lifted containers.

The process 1100 may proceed to move fork assemblies carrying the lowest layer of lifted containers toward the transfer elevator, as at 1110. For example, the plurality of fork assemblies that have engaged and lifted the lowest layer of lifted containers may move substantially vertically relative to the frame and toward the transfer elevator. As described herein, the plurality of fork assemblies may include extension/retraction rods, fork platforms, and fork assembly brackets, and the frame may include vertical supports to which the fork assembly brackets are movably coupled. The extension/retraction rods and fork platforms may be moved substantially vertically relative to the frame by one or more actuators associated with the fork assembly brackets and/or the vertical supports. Further, a controller may instruct actuation of the one or more actuators to move the extension/retraction rods and fork platforms substantially vertically relative to the frame to move the lowest layer of lifted containers toward the transfer elevator.

The process 1100 may continue with determining whether the lowest layer of lifted containers is supported by the transfer elevator, as at 1112. For example, positions of the transfer elevator and the lowest layer of lifted containers relative to each other may be determined based on known positions and/or movements of the transfer elevator and/or known positions and/or movements of the plurality of fork assemblies that have engaged and moved the lowest layer of lifted containers, in order to determine whether the lowest layer of lifted containers is supported by the transfer elevator. In addition or alternatively, one or more sensors may be associated with the transfer elevator and/or the plurality of fork assemblies, such as pressure or force sensors, photo-eyes, proximity sensors, imaging sensors, range or time-of-flight sensors, or other types of sensors. Based on data received from the one or more sensors, it may be determined whether the lowest layer of lifted containers is supported by the transfer elevator, and/or whether the lowest layer of lifted containers is no longer supported by the plurality of fork assemblies. Further, a controller may determine whether the lowest layer of lifted containers is supported by the transfer elevator, e.g., based on data associated with known positions and/or movements of the transfer elevator and/or the plurality of fork assemblies, and/or based on data received from one or more sensors associated with the transfer elevator and/or the plurality of fork assemblies.

If it is determined that the lowest layer of lifted containers is not supported by the transfer elevator, then the process 1100 may return to steps 1108 or 1110 to continue to move the transfer elevator toward the lowest layer of lifted containers and/or to continue to move the plurality of fork assemblies carrying the lowest layer of lifted containers toward the transfer elevator.

If, however, it is determined that the lowest layer of lifted containers is supported by the transfer elevator, then the process 1100 may proceed with retracting fork assemblies of the lowest layer of lifted containers to release the containers to the transfer elevator, as at 1114. For example, the plurality of fork assemblies carrying the lowest layer of lifted containers may release the lowest layer of lifted containers by moving the fork assemblies substantially horizontally from extended positions to retracted positions. As described herein, the plurality of fork assemblies may include extension/retraction rods, fork platforms, and fork assembly brackets, and the extension/retraction rods and fork platforms may be moved substantially horizontally from extended positions to retracted positions by one or more actuators associated with the extensions/retraction rods and/or the fork assembly brackets. Further, a controller may instruct actuation of the one or more actuators to move the extension/retraction rods and fork platforms substantially horizontally from the extended positions to the retracted positions to release the lowest layer of lifted containers to the transfer elevator.

The process 1100 may then continue by moving the transfer elevator to align with a takeaway conveyor, as at 1116. For example, a transfer elevator may move substantially vertically relative to the frame to align with a downstream station or downstream conveyor to which the containers may be transferred. As described herein, a transfer elevator assembly may include a transfer elevator frame, a transfer elevator, and one or more transfer elevator actuators configured to move the transfer elevator substantially vertically relative to the transfer elevator frame. Further, a controller may instruct actuation of the one or more transfer elevator actuators to move the transfer elevator substantially vertically relative to the frame to align with a downstream station or downstream conveyor to which the containers may be transferred.

The process 1100 may then proceed by actuating the transfer elevator to transfer containers to the takeaway conveyor, as at 1118. For example, a transfer elevator may include a conveyor or rollers configured to transfer containers received by the transfer elevator to a downstream station or downstream conveyor. Further, a controller may instruct actuation of the conveyor or rollers of the transfer elevator to transfer the containers to a downstream station or downstream conveyor for subsequent operations or processing.

The process 1100 may then continue to determine whether additional layers of lifted containers are to be depalletized, as at 1120. For example, the plurality of fork assemblies of the depalletizing station may have engaged and lifted additional layers of lifted containers that are to be depalletized and transferred to one or more downstream stations or processes. Further, a controller may determine whether additional layers of lifted containers are to be depalletized, e.g., based on data associated with known positions and/or movements of the plurality of fork assemblies, and/or based on data received from one or more sensors associated with the plurality of fork assemblies.

If it is determined that additional layers of lifted containers are to be depalletized, then the process 1100 may return to steps 1108 or 1110 to move the transfer elevator toward the next lowest layer of lifted containers and/or to move the plurality of fork assemblies carrying the next lowest layer of lifted containers toward the transfer elevator, and the remainder of the process 1100 may repeat as described above.

If, however, it is determined that additional layers of lifted containers are not to be depalletized, e.g., based on completing the depalletization of all layers of containers from a stack of containers by the depalletizing station using the transfer elevator, then the process 1100 may end, as at 1122.

Figure 12:
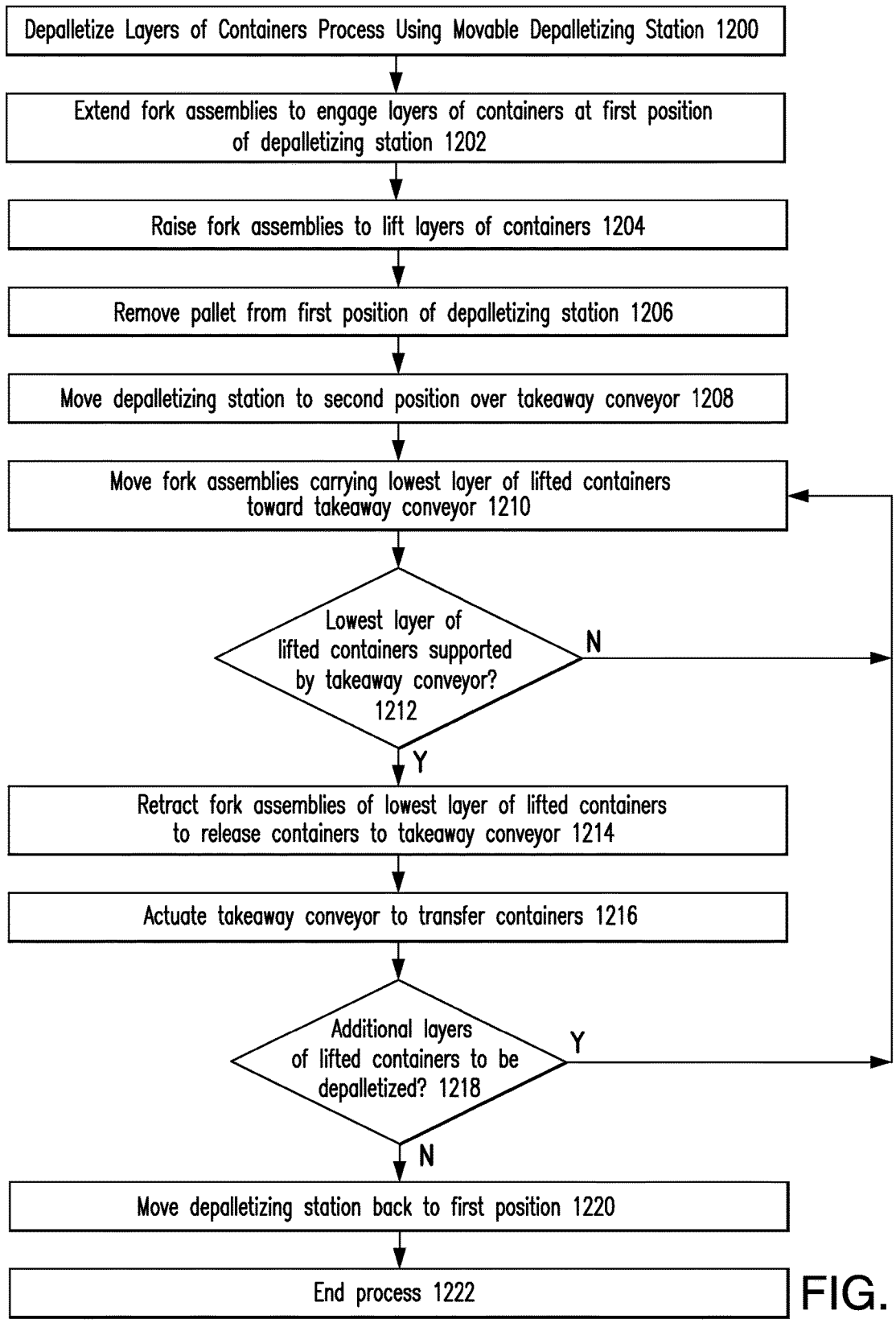
FIG. 12 is a flow diagram illustrating an example depalletize layers of containers process using a movable depalletizing station, in accordance with implementations of the present disclosure.

FIG. 12 is a flow diagram illustrating an example depalletize layers of containers process using a movable depalletizing station 1200, in accordance with implementations of the present disclosure. For example, the process 1200 may include a sequence of operations that may be performed by the example depalletizing station described herein with respect to at least FIGS. 7A-7B. In addition, the process 1200 may comprise an example set of process steps associated with step 1014 of FIG. 10.

The process 1200 may begin by extending fork assemblies to engage layers of containers at a first position of a depalletizing station, as at 1202. For example, at a first position of a movable depalletizing station, a plurality of fork assemblies may engage respective layers of containers of a stack of containers by moving the fork assemblies substantially horizontally from retracted positions to extended positions. As described herein, the plurality of fork assemblies may include extension/retraction rods, fork platforms, and fork assembly brackets, and the extension/retraction rods and fork platforms may be moved substantially horizontally from retracted positions to extended positions by one or more actuators associated with the extensions/retraction rods and/or the fork assembly brackets. In example embodiments, the first position may be associated with receiving pallets of stacked containers by the movable depalletizing station from upstream stations or processes. Further, a controller may instruct actuation of the one or more actuators to move the extension/retraction rods and fork platforms substantially horizontally from the retracted positions to the extended positions to engage respective layers of containers.

The process 1200 may continue by raising fork assemblies to lift layers of containers, as at 1204. For example, at the first position of the movable depalletizing station, the plurality of fork assemblies may raise or lift respective layers of containers by moving the fork assemblies substantially vertically relative to the frame and/or away from the pallet under the layers of containers. As described herein, the plurality of fork assemblies may include extension/retraction rods, fork platforms, and fork assembly brackets, and the frame may include vertical supports to which the fork assembly brackets are movably coupled. The extension/retraction rods and fork platforms may be moved substantially vertically relative to the frame by one or more actuators associated with the fork assembly brackets and/or the vertical supports. Further, a controller may instruct actuation of the one or more actuators to move the extension/retraction rods and fork platforms substantially vertically relative to the frame to raise or lift respective layers of containers.

The process 1200 may proceed by removing the pallet from the first position of the depalletizing station, as at 1206. For example, at the first position of the movable depalletizing station, upon raising or lifting all layers of containers by the plurality of fork assemblies away from the pallet, the empty pallet may be transferred to a subsequent station such as a pallet stacking station. In addition, a transverse conveyor or rollers associated with the first position of the movable depalletizing station may transfer the empty pallet away from the first position of the movable depalletizing station. Further, a controller may instruct actuation of the transverse conveyor or rollers to transfer the empty pallet from the first position of the movable depalletizing station to a subsequent station.

The process 1200 may continue to move the depalletizing station to a second position over a takeaway conveyor, as at 1208. For example, as described herein, a movable frame of the movable depalletizing station may include one or more wheels, rollers, bearings, or other linearly movable, rotatable, or slidable elements, which may interface with or contact one or more rails, tracks, guides, surfaces, or other paths along which the movable frame may move between a first position and a second position of the movable depalletizing station. Further, one or more actuators may be associated with the one or more wheels, rollers, bearings, or other linearly movable, rotatable, or slidable elements and/or the one or more rails, tracks, guides, surfaces, or other paths to move the movable depalletizing station between the first position and the second position. In example embodiments, the second position may be associated with a downstream station or downstream conveyor to which containers may be released and/or transferred to various subsequent stations or processes. Further, a controller may instruct actuation of the one or more actuators to move the movable frame of the movable depalletizing station from the first position to the second position.

The process 1200 may proceed to move fork assemblies carrying the lowest layer of lifted containers toward the takeaway conveyor, as at 1210. For example, at the second position of the movable depalletizing station, the plurality of fork assemblies that have engaged and lifted the lowest layer of lifted containers may move substantially vertically relative to the frame and toward the downstream station or downstream conveyor associated with the second position. As described herein, the plurality of fork assemblies may include extension/retraction rods, fork platforms, and fork assembly brackets, and the frame may include vertical supports to which the fork assembly brackets are movably coupled. The extension/retraction rods and fork platforms may be moved substantially vertically relative to the frame by one or more actuators associated with the fork assembly brackets and/or the vertical supports. Further, a controller may instruct actuation of the one or more actuators to move the extension/retraction rods and fork platforms substantially vertically relative to the frame to move the lowest layer of lifted containers toward the downstream station or downstream conveyor associated with the second position.

The process 1200 may continue with determining whether the lowest layer of lifted containers is supported by the takeaway conveyor, as at 1212. For example, at the second position of the movable depalletizing station, positions of the lowest layer of lifted containers relative to a position of a downstream station or downstream conveyor may be determined based on known positions and/or movements of the plurality of fork assemblies that have engaged and moved the lowest layer of lifted containers, in order to determine whether the lowest layer of lifted containers is supported by the downstream station or downstream conveyor. In addition or alternatively, one or more sensors may be associated with the downstream station or conveyor and/or the plurality of fork assemblies, such as pressure or force sensors, photoeyes, proximity sensors, imaging sensors, range or time-of-flight sensors, or other types of sensors. Based on data received from the one or more sensors, it may be determined whether the lowest layer of lifted containers is supported by the downstream station or conveyor, and/or whether the lowest layer of lifted containers is no longer supported by the plurality of fork assemblies. Further, a controller may determine whether the lowest layer of lifted containers is supported by the downstream station or conveyor, e.g., based on data associated with known positions and/or movements of the plurality of fork assemblies, and/or based on data received from one or more sensors associated with the downstream station or conveyor and/or the plurality of fork assemblies.

If it is determined that the lowest layer of lifted containers is not supported by the downstream station or conveyor, then the process 1200 may return to step 1210 to continue to move the plurality of fork assemblies carrying the lowest layer of lifted containers toward the takeaway conveyor.

If, however, it is determined that the lowest layer of lifted containers is supported by the downstream station or conveyor, then the process 1200 may proceed with retracting fork assemblies of the lowest layer of lifted containers to release the containers to the takeaway conveyor, as at 1214. For example, at the second position of the movable depalletizing station, the plurality of fork assemblies carrying the lowest layer of lifted containers may release the lowest layer of lifted containers by moving the fork assemblies substantially horizontally from extended positions to retracted positions. As described herein, the plurality of fork assemblies may include extension/retraction rods, fork platforms, and fork assembly brackets, and the extension/retraction rods and fork platforms may be moved substantially horizontally from extended positions to retracted positions by one or more actuators associated with the extensions/retraction rods and/or the fork assembly brackets. Further, a controller may instruct actuation of the one or more actuators to move the extension/retraction rods and fork platforms substantially horizontally from the extended positions to the retracted positions to release the lowest layer of lifted containers to the downstream station or conveyor.

The process 1200 may then continue by actuating the takeaway conveyor to transfer the containers, as at 1216. For example, a downstream station may include a conveyor or rollers configured to transfer containers received by the downstream station to various subsequent stations or processes. Further, a controller may instruct actuation of the conveyor or rollers of the downstream station to transfer the containers to various subsequent operations or processing.

The process 1200 may then proceed by determining whether additional layers of lifted containers are to be depalletized, as at 1218. For example, the plurality of fork assemblies of the depalletizing station may have engaged and lifted additional layers of lifted containers that are to be depalletized and transferred to one or more downstream stations or processes. Further, a controller may determine whether additional layers of lifted containers are to be depalletized, e.g., based on data associated with known positions and/or movements of the plurality of fork assemblies, and/or based on data received from one or more sensors associated with the plurality of fork assemblies.

If it is determined that additional layers of lifted containers are to be depalletized, then the process 1200 may return to step 1210 to move the plurality of fork assemblies carrying the next lowest layer of lifted containers toward the takeaway conveyor at the second position of the movable depalletizing station, and the remainder of the process 1200 may repeat as described above.

If, however, it is determined that additional layers of lifted containers are not to be depalletized, e.g., based on completing the depalletization of all layers of containers from a stack of containers by the movable depalletizing station at the second position, then the process 1200 may continue to move the depalletizing station back to the first position, as at 1220. For example, as described herein, a movable frame of the movable depalletizing station may include one or more wheels, rollers, bearings, or other linearly movable, rotatable, or slidable elements, which may interface with or contact one or more rails, tracks, guides, surfaces, or other paths along which the movable frame may move between a first position and a second position of the movable depalletizing station. Further, one or more actuators may be associated with the one or more wheels, rollers, bearings, or other linearly movable, rotatable, or slidable elements and/or the one or more rails, tracks, guides, surfaces, or other paths to move the movable depalletizing station between the first position and the second position. Further, a controller may instruct actuation of the one or more actuators to move the movable frame of the movable depalletizing station from the second position back to the first position. Then, the process 1200 may end, as at 1222.

Figure 13:
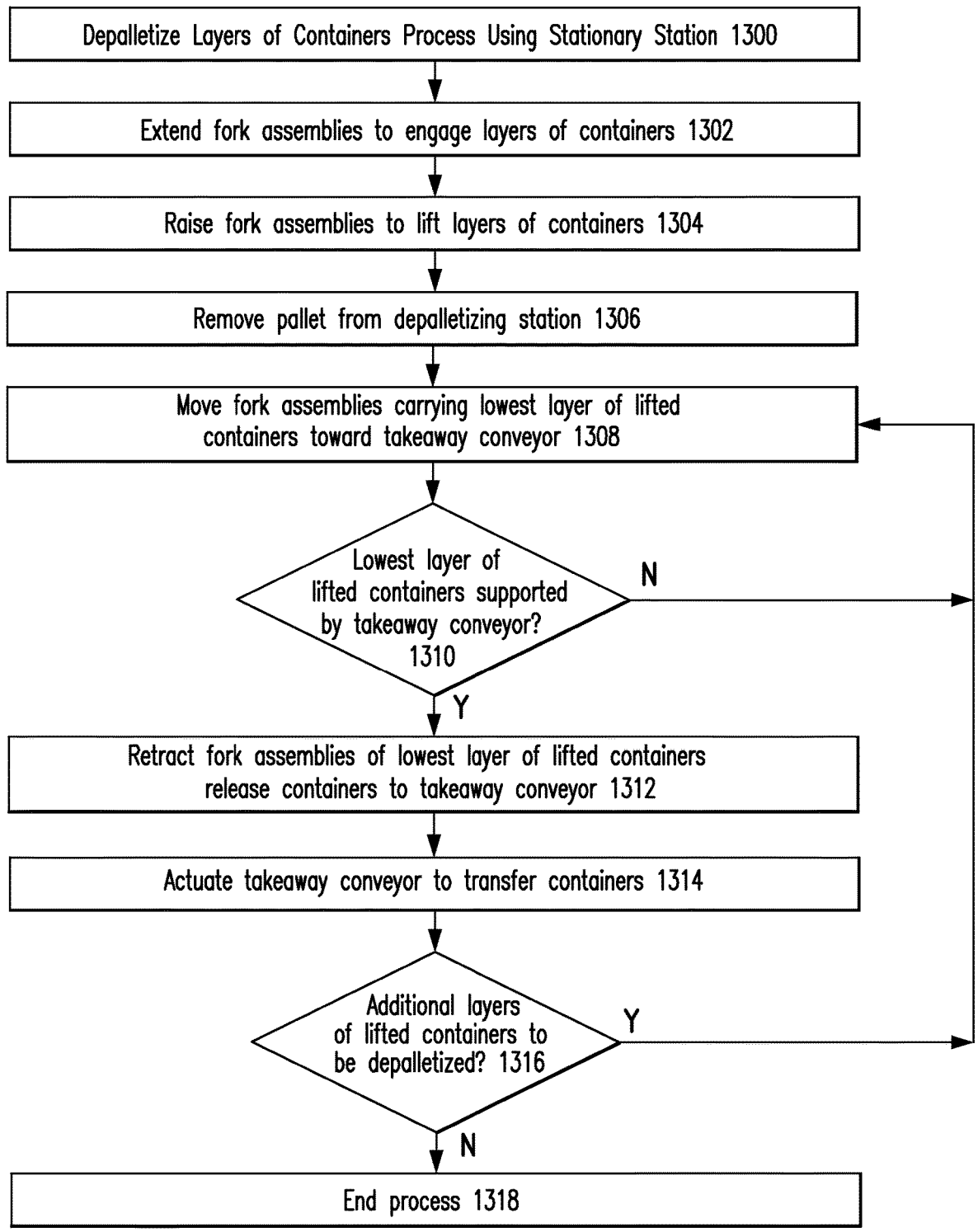
FIG. 13 is a flow diagram illustrating an example depalletize layers of containers process using a stationary depalletizing station, in accordance with implementations of the present disclosure.

FIG. 13 is a flow diagram illustrating an example depalletize layers of containers process using a stationary depalletizing station 1300, in accordance with implementations of the present disclosure. For example, the process 1300 may include a sequence of operations that may be performed by the example depalletizing station described herein with respect to at least FIGS. 8-9. In addition, the process 1300 may comprise an example set of process steps associated with step 1014 of FIG. 10.

The process 1300 may begin by extending fork assemblies to engage layers of containers, as at 1302. For example, a plurality of fork assemblies of a stationary depalletizing station may engage respective layers of containers of a stack of containers by moving the fork assemblies substantially horizontally from retracted positions to extended positions. As described herein, the plurality of fork assemblies may include extension/retraction rods, fork platforms, and fork assembly brackets, and the extension/retraction rods and fork platforms may be moved substantially horizontally from retracted positions to extended positions by one or more actuators associated with the extensions/retraction rods and/or the fork assembly brackets. Further, a controller may instruct actuation of the one or more actuators to move the extension/retraction rods and fork platforms substantially horizontally from the retracted positions to the extended positions to engage respective layers of containers.

The process 1300 may continue by raising fork assemblies to lift layers of containers, as at 1304. For example, the plurality of fork assemblies of the stationary depalletizing station may raise or lift respective layers of containers by moving the fork assemblies substantially vertically relative to the frame and/or away from the pallet under the layers of containers. As described herein, the plurality of fork assemblies may include extension/retraction rods, fork platforms, and fork assembly brackets, and the frame may include vertical supports to which the fork assembly brackets are movably coupled. The extension/retraction rods and fork platforms may be moved substantially vertically relative to the frame by one or more actuators associated with the fork assembly brackets and/or the vertical supports. Further, a controller may instruct actuation of the one or more actuators to move the extension/retraction rods and fork platforms substantially vertically relative to the frame to raise or lift respective layers of containers.

The process 1300 may proceed by removing the pallet from the depalletizing station, as at 1306. For example, upon raising or lifting all layers of containers by the plurality of fork assemblies away from the pallet, the empty pallet may be transferred to a subsequent station such as a pallet stacking station. In addition, a transverse conveyor or rollers associated with the stationary depalletizing station may transfer the empty pallet away from the stationary depalletizing station. Further, a controller may instruct actuation of the transverse conveyor or rollers to transfer the empty pallet from the stationary depalletizing station to a subsequent station.

The process 1300 may continue to move fork assemblies carrying the lowest layer of lifted containers toward the takeaway conveyor, as at 1308. For example, the plurality of fork assemblies of the stationary depalletizing station that have engaged and lifted the lowest layer of lifted containers may move substantially vertically relative to the frame and toward a conveyor or rollers under the layers of containers. As described herein, the plurality of fork assemblies may include extension/retraction rods, fork platforms, and fork assembly brackets, and the frame may include vertical supports to which the fork assembly brackets are movably coupled. The extension/retraction rods and fork platforms may be moved substantially vertically relative to the frame by one or more actuators associated with the fork assembly brackets and/or the vertical supports. Further, a controller may instruct actuation of the one or more actuators to move the extension/retraction rods and fork platforms substantially vertically relative to the frame to move the lowest layer of lifted containers toward the conveyor or rollers under the layers of containers.

The process 1300 may proceed to determine whether the lowest layer of lifted containers is supported by the takeaway conveyor, as at 1310. For example, positions of the lowest layer of lifted containers relative to a position of a conveyor or rollers under the layers of containers may be determined based on known positions and/or movements of the plurality of fork assemblies that have engaged and moved the lowest layer of lifted containers, in order to determine whether the lowest layer of lifted containers is supported by the conveyor or rollers under the layers of containers. In addition or alternatively, one or more sensors may be associated with the conveyor or rollers under the layers of containers and/or the plurality of fork assemblies, such as pressure or force sensors, photoeyes, proximity sensors, imaging sensors, range or time-of-flight sensors, or other types of sensors. Based on data received from the one or more sensors, it may be determined whether the lowest layer of lifted containers is supported by the conveyor or rollers under the layers of containers, and/or whether the lowest layer of lifted containers is no longer supported by the plurality of fork assemblies. Further, a controller may determine whether the lowest layer of lifted containers is supported by the conveyor or rollers under the layers of containers, e.g., based on data associated with known positions and/or movements of the plurality of fork assemblies, and/or based on data received from one or more sensors associated with the conveyor or rollers under the layers of containers and/or the plurality of fork assemblies.

If it is determined that the lowest layer of lifted containers is not supported by the conveyor or rollers under the layers of containers, then the process 1300 may return to step 1308 to continue to move the plurality of fork assemblies carrying the lowest layer of lifted containers toward the takeaway conveyor.

If, however, it is determined that the lowest layer of lifted containers is supported by the conveyor or rollers under the layers of containers, then the process 1300 may continue with retracting fork assemblies of the lowest layer of lifted containers to release the containers to the takeaway conveyor, as at 1312. For example, the plurality of fork assemblies of the stationary depalletizing station carrying the lowest layer of lifted containers may release the lowest layer of lifted containers by moving the fork assemblies substantially horizontally from extended positions to retracted positions. As described herein, the plurality of fork assemblies may include extension/retraction rods, fork platforms, and fork assembly brackets, and the extension/retraction rods and fork platforms may be moved substantially horizontally from extended positions to retracted positions by one or more actuators associated with the extensions/retraction rods and/or the fork assembly brackets. Further, a controller may instruct actuation of the one or more actuators to move the extension/retraction rods and fork platforms substantially horizontally from the extended positions to the retracted positions to release the lowest layer of lifted containers to the conveyor or rollers under the layers of containers.

The process 1300 may then continue by actuating the takeaway conveyor to transfer the containers, as at 1314. For example, the conveyor or rollers under the layers of containers may be configured to transfer containers received thereon to various subsequent stations or processes. Further, a controller may instruct actuation of the conveyor or rollers under the layers of containers to transfer the containers to various subsequent operations or processing.

The process 1300 may then proceed by determining whether additional layers of lifted containers are to be depalletized, as at 1316. For example, the plurality of fork assemblies of the stationary depalletizing station may have engaged and lifted additional layers of lifted containers that are to be depalletized and transferred to one or more downstream stations or processes. Further, a controller may determine whether additional layers of lifted containers are to be depalletized, e.g., based on data associated with known positions and/or movements of the plurality of fork assemblies, and/or based on data received from one or more sensors associated with the plurality of fork assemblies.

If it is determined that additional layers of lifted containers are to be depalletized, then the process 1300 may return to step 1308 to move the plurality of fork assemblies of the stationary depalletizing station carrying the next lowest layer of lifted containers toward the takeaway conveyor, and the remainder of the process 1300 may repeat as described above.

If, however, it is determined that additional layers of lifted containers are not to be depalletized, e.g., based on completing the depalletization of all layers of containers from a stack of containers by the stationary depalletizing station, then the process 1300 may end, as at 1318.

Figure 14:
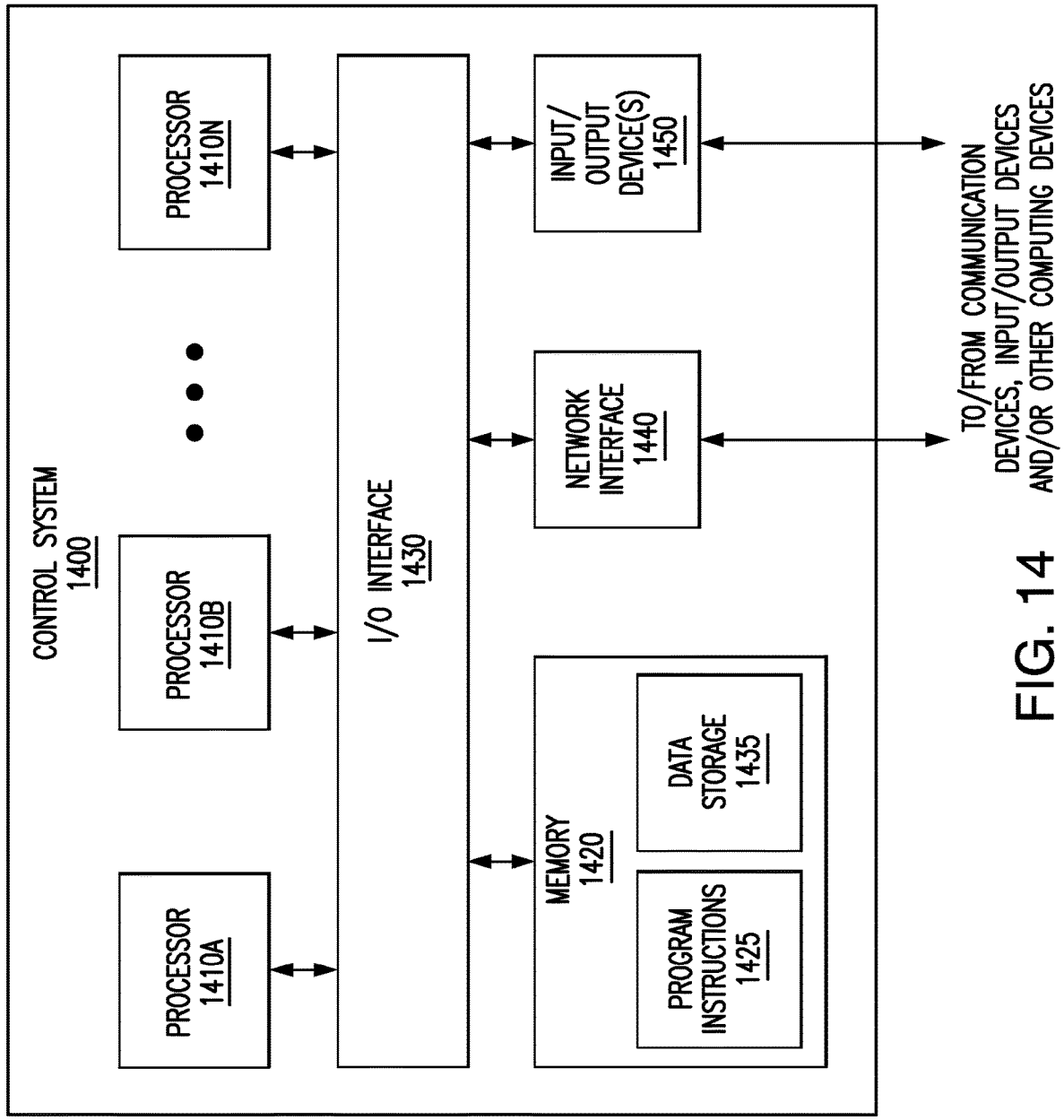
FIG. 14 is a block diagram illustrating an example control system, in accordance with implementations of the present disclosure.

FIG. 14 is a block diagram illustrating an example control system 1400, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 14. In the illustrated implementation, a control system 1400 includes one or more processors 1410A, 1410B through 1410N, coupled to a non-transitory computer-readable storage medium 1420 via an input/output (I/O) interface 1430. The control system 1400 further includes a network interface 1440 coupled to the I/O interface 1430, and one or more input/output devices 1450. In some implementations, it is contemplated that a described implementation may be implemented using a single instance of the control system 1400 while, in other implementations, multiple such systems or multiple nodes making up the control system 1400 may be configured to host different portions or instances of the described implementations. For example, in one implementation, some data sources or services (e.g., related to portions of container depalletizing systems, operations, or processes, etc.) may be implemented via one or more nodes of the control system 1400 that are distinct from those nodes implementing other data sources or services (e.g., related to other portions of container depalletizing systems, operations, or processes, etc.).

In various implementations, the control system 1400 may be a uniprocessor system including one processor 1410A, or a multiprocessor system including several processors 1410A-1410N (e.g., two, four, eight, or another suitable number). The processors 1410A-1410N may be any suitable processor capable of executing instructions. For example, in various implementations, the processors 1410A-1410N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1410A-1410N may commonly, but not necessarily, implement the same ISA.

The non-transitory computer-readable storage medium 1420 may be configured to store executable instructions and/or data accessible by the one or more processors 1410A-1410N. In various implementations, the non-transitory computer-readable storage medium 1420 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1420 as program instructions 1425 and data storage 1435, respectively. In other implementations, program instructions and/or data may be received, sent or stored upon different types of computer-accessible media, such as non-transitory media, or on similar media separate from the non-transitory computer-readable storage medium 1420 or the control system 1400. Generally speaking, a non-transitory, computer-readable storage medium may include storage media or memory media such as magnetic or optical media, e.g., disk or CD/DVD-ROM, coupled to the control system 1400 via the I/O interface 1430. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1440.

In one implementation, the I/O interface 1430 may be configured to coordinate I/O traffic between the processors 1410A-1410N, the non-transitory computer-readable storage medium 1420, and any peripheral devices, including the network interface 1440 or other peripheral interfaces, such as input/output devices 1450. In some implementations, the I/O interface 1430 may perform any necessary protocol, timing or other data transformations to convert data signals from one component (e.g., non-transitory computer-readable storage medium 1420) into a format suitable for use by another component (e.g., processors 1410A-1410N). In some implementations, the I/O interface 1430 may include support for devices attached through various types of peripheral buses, such as a variant of the Peripheral Component Interconnect (PCI) bus standard or the Universal Serial Bus (USB) standard, for example. In some implementations, the function of the I/O interface 1430 may be split into two or more separate components, such as a north bridge and a south bridge, for example. Also, in some implementations, some or all of the functionality of the I/O interface 1430, such as an interface to the non-transitory computer-readable storage medium 1420, may be incorporated directly into the processors 1410A-1410N.

The network interface 1440 may be configured to allow data to be exchanged between the control system 1400 and other devices attached to a network, such as other control systems, material handling system controllers, warehouse management systems, other computer systems, robotic arms, machines, or systems, container depalletizing apparatus, machines, or systems (and components thereof), various types of actuators, various types of sensors, various types of vision systems, imaging devices, or imaging sensors, upstream stations or processes, downstream stations or processes, other material handling systems or equipment, or between nodes of the control system 1400. In various implementations, the network interface 1440 may support communication via wired or wireless general data networks, such as any suitable type of Ethernet network.

Input/output devices 1450 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 1400. Multiple input/output devices 1450 may be present in the control system 1400 or may be distributed on various nodes of the control system 1400. In some implementations, similar input/output devices may be separate from the control system 1400 and may interact with one or more nodes of the control system 1400 through a wired or wireless connection, such as over the network interface 1440.

As shown in FIG. 14, the memory 1420 may include program instructions 1425 that may be configured to implement one or more of the described implementations and/or provide data storage 1435, which may comprise various tables, data stores and/or other data structures accessible by the program instructions 1425. The program instructions 1425 may include various executable instructions, programs, or applications to facilitate container depalletizing operations and processes described herein, such as container depalletizing system, apparatus, or station controllers, drivers, or applications, fork assembly controllers, drivers, or applications, transfer elevator assembly controllers, drivers, or applications, movable depalletizing station controllers, drivers, or applications, stationary depalletizing station controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 1435 may include various data stores for maintaining data related to systems, operations, or processes described herein, such as container depalletizing systems, apparatus, or stations, fork assemblies, transfer elevator assemblies, movable frames, stationary frames, actuators, sensors, sensor data, vision systems or imaging devices, imaging data, containers, container data, items or objects, item or object data, material handling equipment or apparatus, upstream systems, stations, or processes, downstream systems, stations, or processes, etc.

Those skilled in the art will appreciate that the control system 1400 is merely illustrative and is not intended to limit the scope of implementations. In particular, the control system and devices may include any combination of hardware or software that can perform the indicated functions, including computers, network devices, internet appliances, robotic devices, etc. The control system 1400 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 10-13, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A container depalletizing station, comprising:
   a frame configured to receive a stack of containers on a pallet;
   a plurality of fork assemblies movably coupled to the frame, each of the plurality of fork assemblies configured to move vertically relative to the frame, and each of the plurality of fork assemblies configured to move between an extended position and a retracted position;
   wherein the plurality of fork assemblies includes a first set of fork assemblies and a second set of fork assemblies that are vertically stacked relative to each other, individual ones of the first set and the second set configured to concurrently lift individual layers of containers of the stack of containers; and
   wherein the first set of fork assemblies and the second set of fork assemblies respectively include at least one fork positioned on opposite sides of the frame to thereby concurrently lift respective individual layers of containers;
   a transfer elevator positioned underneath the stack of containers and configured to move vertically relative to the frame; and
   a controller configured to at least:
      instruct the plurality of fork assemblies to move to respective extended positions to engage respective containers of the stack of containers;
      instruct the plurality of fork assemblies to lift respective containers of the stack of containers to respective vertical positions relative to the frame;
      instruct the transfer elevator to transfer the pallet to a pallet stacking station;
      instruct the transfer elevator to move vertically relative to the frame to a position supporting a lowest layer of containers of the stack of containers;
      instruct at least some of the plurality of fork assemblies to move to respective retracted positions to release respective containers of the lowest layer of containers of the stack of containers; and
      instruct the transfer elevator to transfer respective containers of the lowest layer of containers to a downstream conveyor.

2. The container depalletizing station of claim 1, wherein the controller is further configured to at least:
   instruct the at least some of the plurality of forks assemblies to lower respective containers of the lowest layer of containers of the stack of containers to contact the transfer elevator at the position supporting the lowest layer of containers of the stack of containers.

3. The container depalletizing station of claim 1, wherein the controller is further configured to at least:
   instruct the transfer elevator to move vertically relative to the frame to a position aligned with the downstream conveyor.

4. The container depalletizing station of claim 1, wherein each of the plurality of fork assemblies includes at least three forks configured to support ribs or edges of respective containers in the extended position.

5. A system, comprising:
   a frame configured to receive a stack of containers;
   a plurality of fork assemblies movably coupled to the frame, each of the plurality of fork assemblies configured to move vertically relative to the frame, and each of the plurality of fork assemblies configured to move between an extended position and a retracted position;
   wherein each of the plurality of fork assemblies is configured to move to respective extended positions to engage and lift respective containers of the stack of containers;
   wherein the plurality of fork assemblies includes at least two sets of fork assemblies that are vertically stacked relative to each other, individual ones of the at least two sets of fork assemblies configured to concurrently lift individual layers of containers of the stack of containers; and
   wherein each of the at least two sets of fork assemblies includes at least one fork positioned on opposite sides of the frame to thereby concurrently lift respective individual layers of containers.

6. The system of claim 5, further comprising:
   a conveyor positioned under the stack of containers and configured to transfer containers to a downstream station;
   wherein each of the plurality of fork assemblies in respective extended positions is configured to lower respective containers of the stack of containers onto the conveyor; and
   wherein each of the plurality of fork assemblies is configured to move to respective retracted positions to release respective containers of the stack of containers to be transferred by the conveyor to the downstream station.

7. The system of claim 5, wherein each of the plurality of fork assemblies includes:
   at least one outer fork configured to engage and support an outer edge or rib of a respective container;
   at least one inner fork configured to engage and support an inner edge or rib of a respective container;
   wherein at least one of:
      the at least one outer fork is movable toward or away from the at least one inner fork;
      the at least one inner fork is movable toward or away from the at least one outer fork; or
      the at least one outer fork and the at least one inner fork are passively rotatable relative to a respective container.

8. The system of claim 5, wherein each of the plurality of fork assemblies includes:
   at least one first actuator configured to move a fork assembly between a respective extended position and a respective retracted position; and
   at least one second actuator configured to move a fork assembly vertically relative to the frame.

9. The system of claim 5, further comprising:
   a transfer elevator positioned under the stack of containers and configured to move vertically relative to the frame;
   wherein the transfer elevator is configured to move vertically to support and receive respective containers of the stack of containers and transfer the respective containers to a downstream station.

10. The system of claim 9, wherein each of the plurality of fork assemblies in respective extended positions is configured to lower respective containers of the stack of containers onto the transfer elevator; and
wherein each of the plurality of fork assemblies is configured to move to respective retracted positions to release respective containers of the stack of containers to be transferred by the transfer elevator to the downstream station.

11. The system of claim 9, wherein the transfer elevator is configured to move vertically to align with a downstream conveyor to transfer the respective containers of the stack of containers to a downstream station.

12. The system of claim 9, wherein the transfer elevator is coupled to at least one actuator configured to move the transfer elevator vertically relative to the frame.

13. The system of claim 5, further comprising:
at least one rail to which the frame is movably coupled;
wherein the frame is configured to move along the at least one rail between a first position and a second position;
wherein the frame is configured to receive the stack of containers at the first position; and
wherein each of the plurality of fork assemblies is configured to move to respective extended positions to engage and lift respective containers of the stack of containers at the first position.

14. The system of claim 13, further comprising:
a conveyor positioned at the second position and configured to transfer containers to a downstream station;
wherein each of the plurality of fork assemblies in respective extended positions is configured to lower respective containers of the stack of containers onto the conveyor; and
wherein each of the plurality of fork assemblies is configured to move to respective retracted positions to release respective containers of the stack of containers to be transferred by the conveyor to the downstream station.

15. The system of claim 5, further comprising:
a controller configured to at least:
instruct movement of each of the plurality of fork assemblies between respective extended positions and respective retracted positions; and
instruct movement of each of the plurality of fork assemblies vertically relative to the frame.

16. A computer-implemented method, comprising:
instructing, by a controller, each of a plurality of fork assemblies to move to respective extended positions to engage respective containers of a stack of containers, wherein each of the plurality of fork assemblies are movably coupled to a frame that receives the stack of containers; and
instructing, by the controller, each of the plurality of fork assemblies to lift respective containers of the stack of containers to respective vertical positions relative to the frame;
wherein the frame and the plurality of fork assemblies comprise a system;
wherein the frame is configured to receive the stack of containers;
wherein the plurality of fork assemblies are movably coupled to the frame, each of the plurality of fork assemblies configured to move vertically relative to the frame, and each of the plurality of fork assemblies configured to move between an extended position and a retracted position;
wherein each of the plurality of fork assemblies is configured to move to respective extended positions to engage and lift respective containers of the stack of containers;
wherein the plurality of fork assemblies includes at least two sets of fork assemblies that are vertically stacked relative to each other, individual ones of the at least two sets of fork assemblies configured to concurrently lift individual layers of containers of the stack of containers; and
wherein each of the at least two sets of fork assemblies includes at least one fork positioned on opposite sides of the frame to thereby concurrently lift respective individual layers of containers.

17. The computer-implemented method of claim 16, further comprising:
instructing, by the controller, each of the plurality of fork assemblies in respective extended positions to lower respective containers of the stack of containers onto a conveyor configured to transfer containers to a downstream station; and
instructing, by the controller, each of the plurality of fork assemblies to move to respective retracted positions to release respective containers of the stack of containers to be transferred by the conveyor to the downstream station.

18. The computer-implemented method of claim 17, wherein the conveyor comprises a transfer elevator that is vertically movable relative to the frame; and
the computer-implemented method further comprising:
instructing, by the controller, the transfer elevator to move vertically to support and receive respective containers of the stack of containers and to transfer the respective containers to the downstream station.

19. The computer-implemented method of claim 17, wherein the frame receives the stack of containers at a first position;
wherein the frame is movable between the first position and a second position; and
wherein the conveyor is positioned at the second position.

20. The computer-implemented method of claim 19, further comprising:
instructing, by the controller, the frame to move from the first position to the second position;
wherein each of the plurality of fork assemblies is instructed to move to respective extended positions to engage respective containers, and is instructed to lift respective containers at the first position; and
wherein each of the plurality of fork assemblies is instructed to lower respective containers, and is instructed to move to respective retracted positions to release respective containers to the conveyor at the second position.

* * * * *